US012680519B2

(12) United States Patent
Centmayer et al.

(10) Patent No.: US 12,680,519 B2
(45) Date of Patent: Jul. 14, 2026

(54) ENGINE ASSEMBLY OIL MANAGEMENT

(71) Applicant: Arctic Cat Inc., Thief River Falls, MN (US)

(72) Inventors: Ralf Centmayer, Markdorf (DE); Jochen Hämmerle, Waldburg (DE); Dirk Winkler, Stetten (DE)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/650,021

(22) Filed: Apr. 29, 2024

(65) Prior Publication Data

US 2024/0392710 A1 Nov. 28, 2024

Related U.S. Application Data

(60) Provisional application No. 63/545,106, filed on Oct. 20, 2023, provisional application No. 63/544,072,
(Continued)

(51) Int. Cl.
*F02F 7/00* (2006.01)
*F01L 1/02* (2006.01)
(Continued)

(52) U.S. Cl.
CPC ............ *F02F 7/0031* (2013.01); *F01L 1/053* (2013.01); *F02F 1/24* (2013.01); *F02F 7/0046* (2013.01);
(Continued)

(58) Field of Classification Search
CPC ..... F01M 11/02; F01M 9/106; F01L 13/0036; F01L 1/022
See application file for complete search history.

(56) References Cited

U.S. PATENT DOCUMENTS 1,066,522 A 7/1913 Owens
1,714,246 A 5/1929 Seibert
(Continued)

FOREIGN PATENT DOCUMENTS

CN 201610785 U 10/2010
CN 202402153 U 8/2012
(Continued)

OTHER PUBLICATIONS

Wojteczko, A. et al., "Designing a Dry-Sump Oiling System," Tech, Project S2000, Modified.com, Aug. 2013, pp. 68-70, retrieved from the Internet on May 24, 2013, MODP-130800-S2K.indd.
(Continued)

*Primary Examiner* — Kevin A Lathers
(74) *Attorney, Agent, or Firm* — Billion & Armitage

(57) ABSTRACT

The present disclosure relates to an engine assembly for a vehicle. The engine assembly includes an oil reservoir to receive oil from a crankcase. The oil reservoir is external to the crankcase and positioned rearward of the crankcase. The engine assembly also includes at least one scavenge pump configured to pump the oil from an oil collection pan. The scavenge pump is positioned within the crankcase forward of the crankshaft and includes a suction tube extending rearwardly to a low point in the oil collection pan. The engine assembly further includes a drive mechanism to drive a feed pump and the at least one scavenge pump with the crankshaft. The drive mechanism includes an oil pump shaft to drive the feed pump and includes a gear train coupled to the oil pump shaft to drive the at least one scavenge pump.

22 Claims, 23 Drawing Sheets

Related U.S. Application Data filed on Oct. 13, 2023, provisional application No. 63/542,865, filed on Oct. 6, 2023, provisional application No. 63/468,357, filed on May 23, 2023.

(51) Int. Cl.
*F01L 1/053* (2006.01)
*F02F 1/24* (2006.01)
*F02F 1/42* (2006.01)
*F02F 11/00* (2006.01)

(52) U.S. Cl.
CPC ............ *F02F 7/0085* (2013.01); *F01L 1/022* (2013.01); *F01L 2001/0537* (2013.01); *F01L 2250/02* (2013.01); *F02F 1/242* (2013.01); *F02F 1/4285* (2013.01); *F02F 2007/0041* (2013.01); *F02F 7/006* (2013.01); *F02F 2007/0063* (2013.01); *F02F 11/005* (2013.01)

(56) References Cited

U.S. PATENT DOCUMENTS 2,165,808 A 7/1939 Daniel
2,963,007 A 12/1960 Leach
3,418,993 A 12/1968 Andreas et al.
3,482,553 A 12/1969 Buchwald
4,121,558 A 10/1978 Sakakibara et al.
4,121,559 A 10/1978 Yamada
4,597,372 A 7/1986 Furukawa
4,723,529 A 2/1988 Yokoi et al.
5,031,586 A 7/1991 Masuda
5,123,385 A 6/1992 Sado et al.
5,367,993 A 11/1994 Tulah
5,735,239 A 4/1998 Sugano et al.
5,934,234 A 8/1999 Shichinohe et al.
5,975,041 A 11/1999 Narita et al.
5,992,355 A 11/1999 Shichinohe et al.
5,996,541 A 12/1999 Voigt et al.
6,138,633 A 10/2000 Prior
6,247,442 B1 6/2001 Bedard et al.
6,443,136 B1 9/2002 Suganami et al.
6,446,585 B1 9/2002 Coffey et al.
6,688,928 B2 2/2004 Gokan et al.
6,715,461 B2 4/2004 Ito et al.
6,732,700 B2 5/2004 Suganuma
6,886,514 B2 5/2005 Matsuda
6,889,651 B2 5/2005 Tanaka et al.
7,007,655 B2 3/2006 Yamamoto
7,055,488 B2 6/2006 Tawa et al.
7,066,134 B2 6/2006 Fukuda et al.
7,082,904 B2 8/2006 Takano
7,089,890 B2 8/2006 Obidi
7,124,732 B2 10/2006 Sugamuna et al.
7,131,412 B2 11/2006 Tsutsumi et al.
7,159,680 B2 1/2007 Pichler et al.
7,163,074 B2 1/2007 Inomori et al.
7,178,498 B2 2/2007 Takeuchi
7,194,985 B2 3/2007 Wachigai et al.
7,201,132 B2 4/2007 Miyake et al.
7,216,612 B2 5/2007 Futakuchi et al.
7,264,086 B2 9/2007 Ito et al.
7,278,381 B2 10/2007 Matsutani et al.
7,290,514 B2 11/2007 Hoi
7,293,756 B2 11/2007 Utsumi et al.
7,316,208 B2 1/2008 Tanaka et al.
7,363,903 B2 4/2008 Matsuda
7,398,753 B2 7/2008 Masuda et al.
7,400,053 B2 7/2008 Wilson et al.
7,565,891 B2 7/2009 Takano et al.
7,568,463 B1 8/2009 Kuykendall
7,597,069 B2 10/2009 Ashida
7,597,079 B2 10/2009 Oga et al.
7,607,958 B1 10/2009 Hochmayr et al.
7,610,987 B2 11/2009 Aoyama
7,628,131 B2 12/2009 Takano et al.
7,685,982 B2 3/2010 Inaba et al.
7,695,575 B2 4/2010 Okumura et al.
7,717,234 B2 5/2010 Mizuno et al.
7,743,741 B2 6/2010 Matsuda
7,765,977 B2 8/2010 Kurita et al.
7,779,803 B2 8/2010 Yamamoto et al.
7,883,312 B2 2/2011 Eguchi et al.
7,958,875 B2 6/2011 Tsubakino et al.
RE42,841 E 10/2011 Oishi et al.
8,047,174 B2 11/2011 Iwasaki et al.
8,061,467 B2 11/2011 Takeshima et al.
8,141,673 B2 3/2012 Sato et al.
8,171,897 B2 5/2012 Sugiura
8,245,588 B2 8/2012 Ogasawara et al.
8,256,576 B2 9/2012 Glahn et al.
8,297,251 B2 10/2012 Asaya
8,317,653 B2 11/2012 Nogi
8,381,697 B2 2/2013 Yasui et al.
8,381,706 B2 2/2013 Akiyama et al.
8,393,306 B2 3/2013 Schiffer et al.
8,448,740 B2 5/2013 Inui et al.
8,464,681 B2 6/2013 Matsuo et al.
8,539,923 B2 9/2013 Matsuo
8,544,427 B2 10/2013 Maruyama et al.
8,556,021 B2 10/2013 Wagatsuma et al.
8,656,885 B2 2/2014 Negoro et al.
8,662,233 B2 3/2014 Saitoh et al.
8,813,715 B2 8/2014 Kasai et al.
8,833,340 B2 9/2014 Walters
8,844,474 B2 9/2014 Fukuoka et al.
8,844,475 B2 9/2014 Mukouhara et al.
8,844,493 B2 9/2014 Takano
8,845,371 B2 9/2014 Morota et al.
8,887,705 B2 11/2014 Aquino
8,925,500 B2 1/2015 Kisaichi et al.
8,939,131 B2 1/2015 Murakami
9,038,603 B2 5/2015 Ikoma et al.
9,080,497 B2 7/2015 Yamashiro et al.
9,147,522 B2 9/2015 Takahashi et al.
9,151,209 B2 10/2015 Higaki
9,169,803 B2 10/2015 Akiyama et al.
9,228,581 B2 1/2016 Bernier et al.
9,266,421 B2 2/2016 Sugiura
9,279,360 B2 3/2016 Miura et al.
9,284,912 B2 3/2016 Takahashi et al.
9,303,645 B2 4/2016 Oakman
9,328,638 B2 5/2016 Maekawa et al.
9,540,973 B2 1/2017 Ogino et al.
9,555,701 B2 1/2017 Borowicz et al.
9,562,501 B2 2/2017 Takada et al.
9,599,063 B2 3/2017 Harada
9,605,570 B2 3/2017 Harada
9,624,843 B2 4/2017 Nishimoto et al.
9,630,698 B2 4/2017 Morota et al.
9,709,001 B2 7/2017 Buck
9,714,664 B2 7/2017 Ishikawa et al.
9,797,279 B2 10/2017 Tomas et al.
9,810,111 B2 11/2017 Sotani et al.
9,828,079 B2 11/2017 Ochiai
9,850,861 B2 12/2017 Eshima et al.
9,863,295 B2 1/2018 Harada
9,926,816 B2 * 3/2018 Ahmed .............. F01L 13/0005
9,926,819 B2 3/2018 Hatae et al.
9,957,851 B2 5/2018 Takahata et al.
9,964,011 B2 5/2018 Mukohara
10,036,346 B2 7/2018 Maki et al.
10,066,522 B2 9/2018 Nishi et al.
10,107,171 B2 10/2018 Ogino et al.
10,107,173 B2 10/2018 Jyouzaki et al.
10,107,230 B2 10/2018 Koiwa
10,119,427 B1 11/2018 Svegliato
10,161,411 B1 12/2018 Gottschalk et al.
10,167,753 B2 1/2019 Mukohara et al.
10,184,370 B2 1/2019 Odo et al.
10,197,131 B2 2/2019 Mukohara
10,330,043 B2 6/2019 Okada et al.
10,400,834 B2 9/2019 Sugiura et al.
10,408,115 B2 9/2019 Okada et al.
10,464,627 B2 11/2019 Uchida et al.

(56) References Cited

U.S. PATENT DOCUMENTS

| | | | |
|---|---|---|---|
| 10,519,896 B2 | 12/2019 | Wicks | |
| 10,533,470 B2 | 1/2020 | Fujii et al. | |
| 10,570,790 B2 | 2/2020 | Nakamura | |
| 10,584,712 B2 | 3/2020 | Ishikawa et al. | |
| 10,598,056 B2 | 3/2020 | Koide et al. | |
| 10,640,170 B2 | 5/2020 | Okita et al. | |
| 10,690,046 B2 | 6/2020 | Okada et al. | |
| 10,718,238 B2 | 7/2020 | Wenger et al. | |
| 10,720,660 B2 | 7/2020 | Nara et al. | |
| 10,781,769 B2 | 9/2020 | Choudhary et al. | |
| 10,801,607 B2 | 10/2020 | Tanaka et al. | |
| 10,851,680 B2 | 12/2020 | Okamoto | |
| 10,883,443 B2 | 1/2021 | Wicks | |
| 10,883,445 B2 | 1/2021 | Mori et al. | |
| 10,900,441 B2 | 1/2021 | Oshita et al. | |
| 10,900,442 B2 | 1/2021 | Oh | |
| 10,934,969 B2 | 3/2021 | Palazzolo et al. | |
| 10,961,882 B2 | 3/2021 | Yokota et al. | |
| 10,961,905 B2 | 3/2021 | Nukada et al. | |
| 10,968,796 B2 | 4/2021 | Konishi et al. | |
| 10,995,696 B2 | 5/2021 | Mori et al. | |
| 11,008,064 B2 | 5/2021 | Tajiri et al. | |
| 11,035,698 B2 | 6/2021 | Kisaichi et al. | |
| 11,047,272 B2 | 6/2021 | Uezu | |
| 11,066,963 B2 | 7/2021 | Okamoto | |
| 11,092,161 B2 | 8/2021 | Albrecht | |
| 11,131,253 B2 | 9/2021 | Yamamoto et al. | |
| 11,143,085 B2 | 10/2021 | Mori et al. | |
| 11,193,401 B2 | 12/2021 | Okamoto | |
| 11,193,403 B2 | 12/2021 | Okamoto | |
| 11,225,929 B2 | 1/2022 | Takagawa et al. | |
| 11,248,517 B2 | 2/2022 | Jüstel | |
| 11,255,231 B2 | 2/2022 | Fuhrman et al. | |
| 11,255,236 B2 | 2/2022 | Okamoto | |
| 11,255,248 B2 | 2/2022 | Christensen et al. | |
| 11,346,358 B2 | 5/2022 | Takehana et al. | |
| 11,352,915 B2 | 6/2022 | Takeuchi | |
| 11,668,226 B2 | 6/2023 | Christensen et al. | |
| 11,702,965 B2 | 7/2023 | Fuhrman et al. | |
| 12,055,076 B2 | 8/2024 | Fuhrman et al. | |
| 12,092,005 B2 | 9/2024 | Christensen et al. | |
| 2004/0250789 A1 | 12/2004 | Morii et al. | |
| 2004/0257089 A1* | 12/2004 | Aridome | H01M 10/633 324/430 |
| 2005/0051115 A1 | 3/2005 | Wenger | |
| 2007/0157900 A1 | 7/2007 | Suzuki et al. | |
| 2009/0241862 A1* | 10/2009 | Korsumaki | F28D 1/0246 123/41.1 |
| 2016/0341203 A1 | 11/2016 | Parsons et al. | |
| 2017/0130307 A1 | 5/2017 | Li et al. | |
| 2018/0172009 A1 | 6/2018 | Hill et al. | |
| 2018/0251880 A1 | 9/2018 | Scharf | |
| 2018/0320695 A1 | 11/2018 | Zielberg et al. | |
| 2019/0017429 A1 | 1/2019 | Macdonald | |
| 2019/0128284 A1 | 5/2019 | Hoffmann et al. | |
| 2019/0162199 A1 | 5/2019 | Albrecht | |
| 2020/0158047 A1 | 5/2020 | Smith | |
| 2020/0256351 A1 | 8/2020 | Elsesser | |
| 2021/0131376 A1 | 5/2021 | Roth et al. | |
| 2024/0344469 A1 | 10/2024 | Fuhrman et al. | |
| 2024/0392718 A1 | 11/2024 | Christensen et al. | |

FOREIGN PATENT DOCUMENTS

| | | | |
|---|---|---|---|
| CN | 203394864 | U | 1/2014 |
| CN | 204312183 | U | 5/2015 |
| CN | 204440208 | U | 7/2015 |
| CN | 205101105 | U | 3/2016 |
| CN | 206054077 | U | 3/2017 |
| CN | 206129343 | U | 4/2017 |
| CN | 206205976 | U | 5/2017 |
| CN | 106989053 | A | 7/2017 |
| CN | 108252795 | A | 7/2018 |
| CN | 105888768 | | 9/2018 |
| CN | 107542572 | B | 7/2019 |
| CN | 112159950 | A | 1/2021 |
| CZ | 264395 | A3 | 4/1996 |
| DE | 4102715 | A1 | 9/1991 |
| DE | 4121504 | C2 | 7/1995 |
| DE | 10035757 | A1 | 1/2002 |
| DE | 102005061475 | A1 | 6/2007 |
| DE | 102007053493 | A1 | 5/2009 |
| DE | 102012023836 | A1 | 6/2014 |
| DE | 102013225965 | A1 | 7/2014 |
| DE | 102014015653 | A1 | 4/2015 |
| DE | 102014219250 | A1 | 4/2015 |
| DE | 102016001225 | | 8/2016 |
| DE | 102020107259 | A1 | 12/2020 |
| DE | 102014219254 | B4 | 1/2021 |
| EP | 0394832 | B1 | 3/1992 |
| EP | 1820947 | A2 | 8/2007 |
| EP | 2574825 | A1 | 4/2013 |
| EP | 2584165 | A1 | 4/2013 |
| EP | 2589772 | A1 | 5/2013 |
| EP | 2589773 | A1 | 5/2013 |
| EP | 2589835 | A1 | 5/2013 |
| EP | 2923051 | A1 | 9/2015 |
| EP | 3904654 | A1 | 11/2021 |
| GB | 358873 | A | 10/1931 |
| GB | 613388 | A | 11/1948 |
| JP | 2532890 | | 1/1997 |
| JP | 2571371 | | 1/1997 |
| JP | 3295128 | B2 | 4/2002 |
| JP | 2004028057 | | 1/2004 |
| JP | 3547108 | B2 | 4/2004 |
| JP | 4335403 | | 7/2009 |
| JP | 4709068 | B2 | 3/2011 |
| JP | 4842715 | B2 | 10/2011 |
| JP | 6223163 | | 10/2017 |
| JP | 2021095869 | A | 6/2021 |
| KR | 102165036 | B1 | 10/2020 |
| WO | 205146832 | A1 | 10/2015 |
| WO | 2017021635 | A1 | 2/2017 |
| WO | 2017095726 | A1 | 6/2017 |
| WO | 2020111187 | | 6/2020 |
| WO | 2020111188 | | 6/2020 |
| WO | 2022070323 | A1 | 4/2022 |

OTHER PUBLICATIONS

"Hydraulic Lash Adjuster, Rocker Arm [Skyactiv-G 2.0]," 2016 MX-5 Engine, 2016 ND Shop Manual, 6 pages.

Wojteczko, et al., "Project 2000—Self-Bleeding Expansion Tank", Wojteczko, A "Project 2000—Self-Bleeding Expansion Tank," Super Street, How-To-Engine and Drivetrain, Apr. 23, 2013, 4 pages.

* cited by examiner

ENGINE ASSEMBLY OIL MANAGEMENT

PRIORITY CLAIM

This application claims the benefit of priority from U.S. Provisional Patent Application Nos. 63/545,106 filed Oct. 20, 2023; 63/544,072 filed Oct. 13, 2023; 63/542,865 filed Oct. 6, 2023; and 63/468,357 filed May 23, 2023, the contents of which are incorporated herein by reference.

TECHNICAL FIELD OF THE DISCLOSURE

The present disclosure generally relates to engines for vehicles, including an oil management system for an engine assembly for off-road vehicles.

BACKGROUND

An internal combustion engine of a vehicle converts thermal energy into mechanical energy to drive moving parts of the vehicle, thereby enabling motion of the vehicle. Depending on the type of vehicle, designs and structures of the engine may vary to suit the purposes and parameters of the intended vehicle. For instance, off-road vehicles, such as all-terrain vehicles (ATV), side-by-side utility terrain vehicles (UTV or side-by-side), and snowmobiles use internal combustion engines to propel the vehicle. Typically, a four-stroke internal combustion engine (ICE) includes an oil reservoir underneath or at the bottom of the crankcase. This arrangement may be used in a wet sump system where the oil reservoir underneath the crankcase collects oil for a single pump to distribute through the engine. In such a configuration, the wet sump is located at the lowest portion of the engine.

In the conventional wet sump system, the oil reservoir underneath the crankcase adds height to the engine envelope because the total height of the engine must accommodate the height of the oil reservoir underneath the crankcase. This added height positions the weight of the engine farther away from the center of mass of the vehicle or at least higher in the vehicle.

Furthermore, conventional engines generate blow-by gases that include oil. If the oil in the blow-by gases is permitted to leave the engine, such arrangement would result in pollution, reduced performance of the engine, and depletion of the lubricating oil.

BRIEF SUMMARY OF THE DISCLOSURE

The present disclosure is directed toward an engine assembly of a vehicle. The engine assembly has a crankcase that includes a crankshaft. The engine assembly also includes an oil reservoir to receive oil from the crankcase. The oil reservoir is external to and rearward of the crankcase.

In some embodiments, the vehicle includes a snowmobile or an off-road vehicle. In some embodiments, the oil reservoir is positioned within a space between the crankcase and a tunnel for a track drive of the snowmobile or a transmission of the off-road vehicle. In some embodiments, the engine assembly comprises a dry sump, four-stroke engine.

In some embodiments, the engine assembly includes an oil collection pan coupled to the crankcase. The oil collection pan is configured to receive oil from the crankcase. At least one scavenge pump is configured to pump the oil from the oil collection pan. In some embodiments, the at least one scavenge pump is positioned within the crankcase and forward of the crankshaft. In some embodiments, the at least one scavenge pump includes at least one suction tube extending rearwardly to a lowest point of the oil collection pan. In some embodiments, the engine assembly is tilted toward the rear of the vehicle such that the lowest point of the oil collection pan is located at an opening of the at least one suction tube during operation of the vehicle.

In some embodiments, the at least one scavenge pump is located above the opening of the at least one suction tube. The oil collection pan includes an outlet for oil to pass from the at least one scavenge pump out of the oil collection pan.

In some embodiments, the engine assembly further includes a feed pump to pump oil through the engine assembly and includes a drive mechanism to drive the feed pump and the at least one scavenge pump with the crankshaft. In some embodiments, the drive mechanism includes an oil pump shaft to drive the feed pump and a gear train coupled to the oil pump shaft to drive the at least one scavenge pump. In some embodiments, the oil pump shaft passes through the feed pump. In some embodiments, the drive mechanism further includes a sprocket coupled to a first end of the oil pump shaft. In some embodiments, the sprocket couples to the crankshaft with a chain. In some embodiments, the gear train includes a first gear coupled to a second end of the oil pump shaft and includes a second gear coupled to the at least one scavenge pump. In some embodiments, the drive mechanism includes a scavenge pump shaft coupled to the second gear of the gear train. In some embodiments, the scavenge pump shaft drives the at least one scavenge pump.

In some embodiments, the engine assembly includes a cylinder head to cover at least one cylinder. The engine assembly also includes a valve cover that is configured to mount on top of the cylinder head for housing a valve assembly. The valve cover is configured to cover the top of the cylinder head. The valve cover defines a valve chamber. In some embodiments, the engine assembly further includes an oil separator configured to be secured to the cylinder head within the valve chamber. In some embodiments, the oil separator is configured to separate oil from a blow-by gas exiting the engine assembly through an outlet.

In some embodiments, the oil separator shields the outlet from oil splashing within the valve chamber. In some embodiments, the oil separator is configured to define a circuitous route for the oil and blow-by gas to enter the outlet. In some embodiments, the oil separator is configured to define at least one gap with the valve cover. In some embodiments, the blow-by gas and oil to pass through the at least one gap. In some embodiments, the oil separator to reduce speed of the blow-by gas and oil upon entering an oil separation volume. In some embodiments, the oil to separate from the blow-by gas in response to the reduced speed. In some embodiments, the engine assembly with the oil separator provides a wet sump, four-stroke engine.

BRIEF DESCRIPTION OF THE DRAWINGS

Preferred embodiments of the present disclosure are described in detail below with reference to the following drawings.

DETAILED DESCRIPTION OF THE PREFERRED EMBODIMENTS

An engine assembly in accordance with the principles of the present disclosure is generally indicated at reference number 102 in the Figures of the attached drawings, wherein numbered elements in the Figures correspond to like numbered elements herein.

The disclosures of the following applications are hereby incorporated by reference: Application Ser. No. 63/537,179, filed Sep. 7, 2023; Application Ser. No. 63/543,461, filed Oct. 10, 2023; and Application Ser. No. 63/528,411, filed Jul. 23, 2023.

Figure 1:
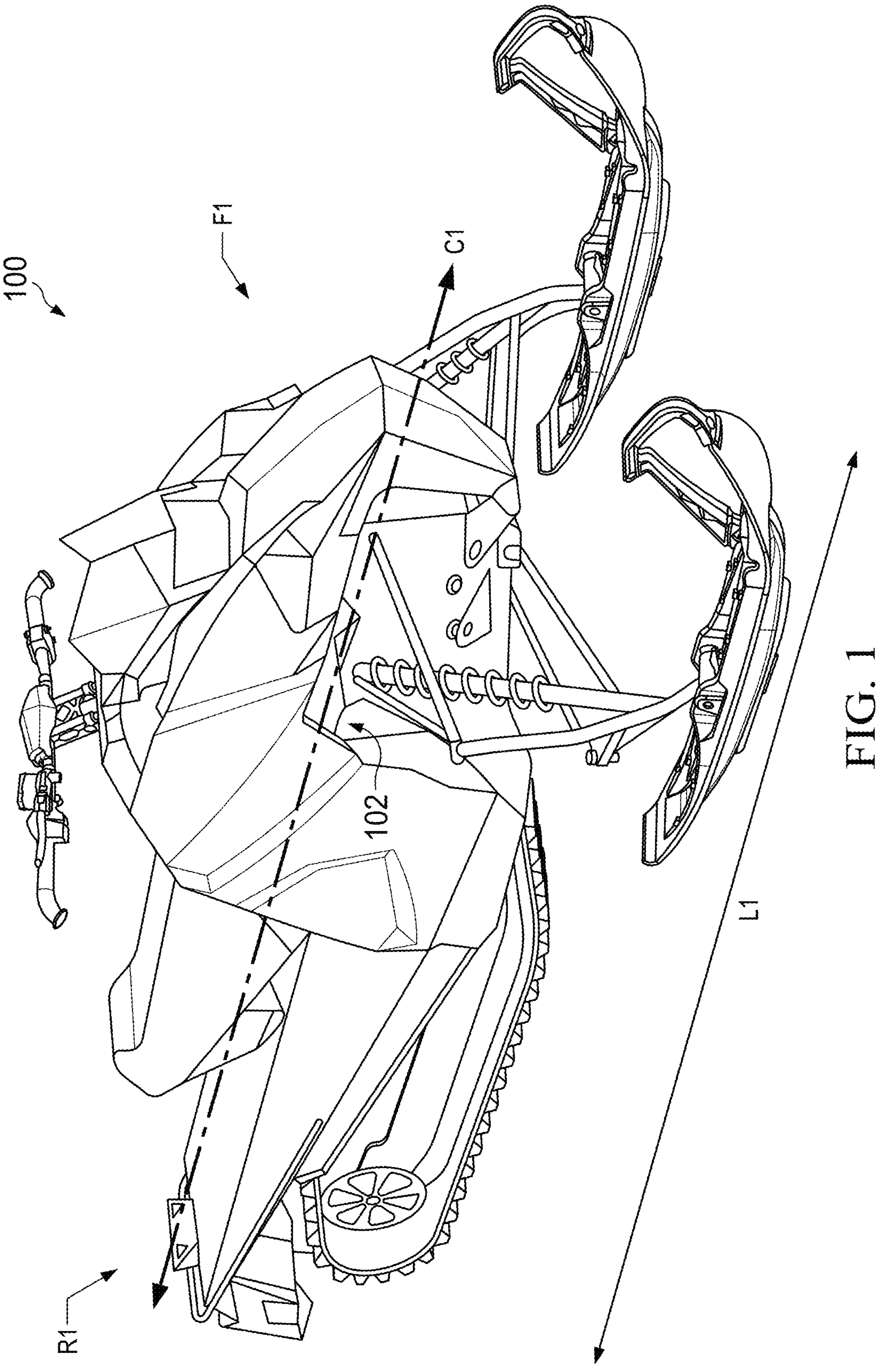
FIGS. 1 and 2 are perspective views of off-road vehicles.
Figure 2:
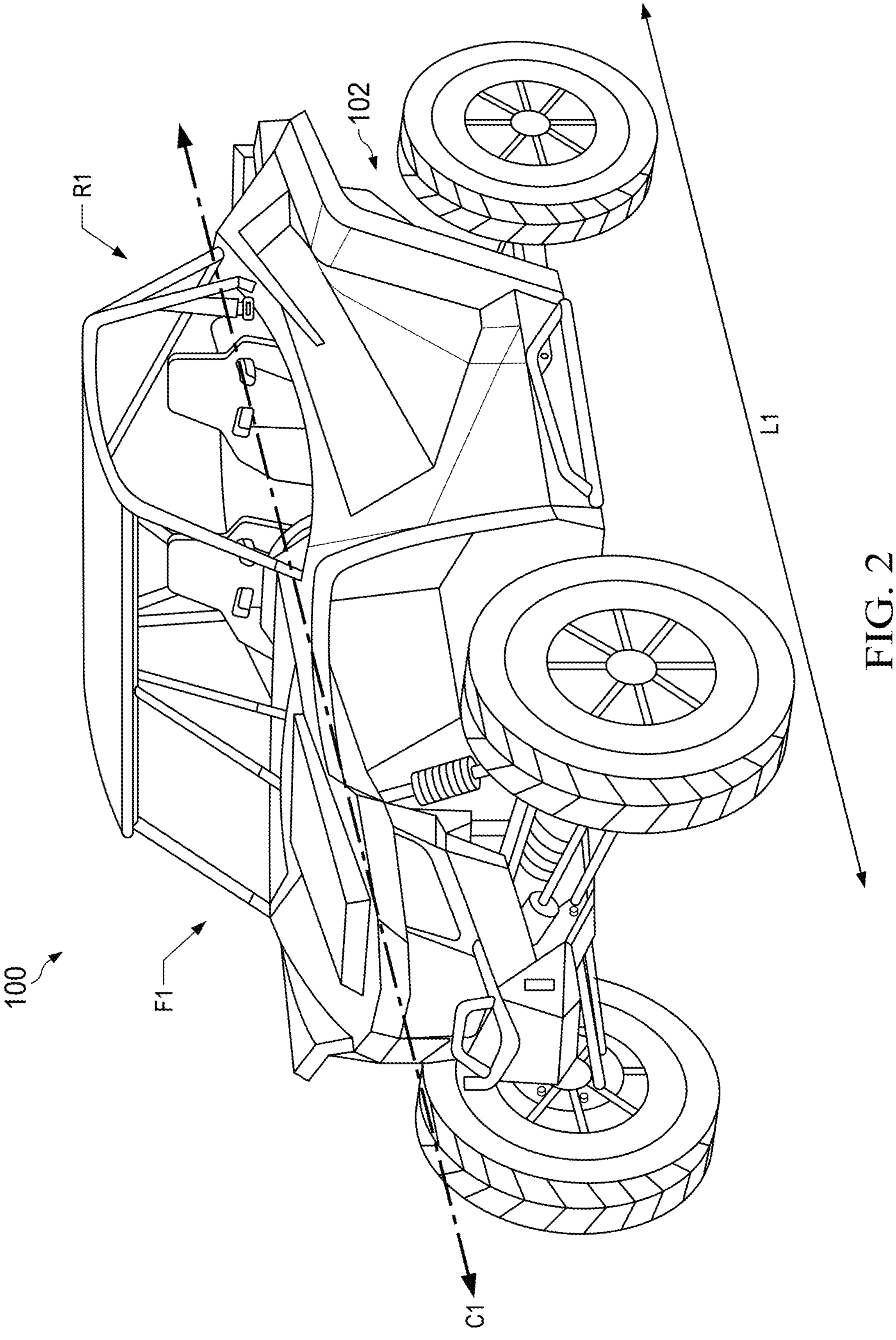
Figure 3:
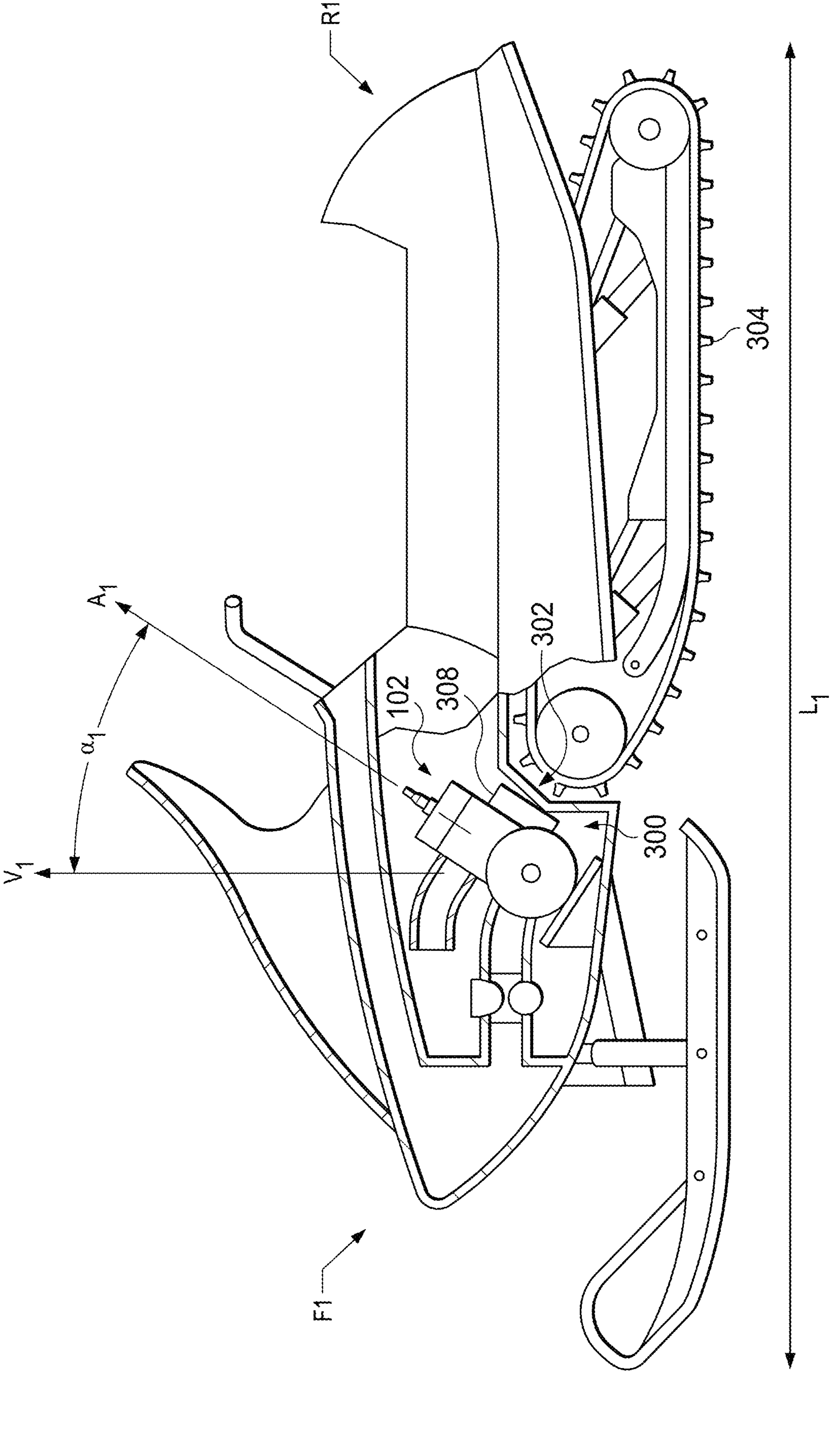
FIG. 3 is a partial cross-sectional view of a vehicle having an engine assembly with an oil reservoir in accordance with the present invention.
Figure 10:
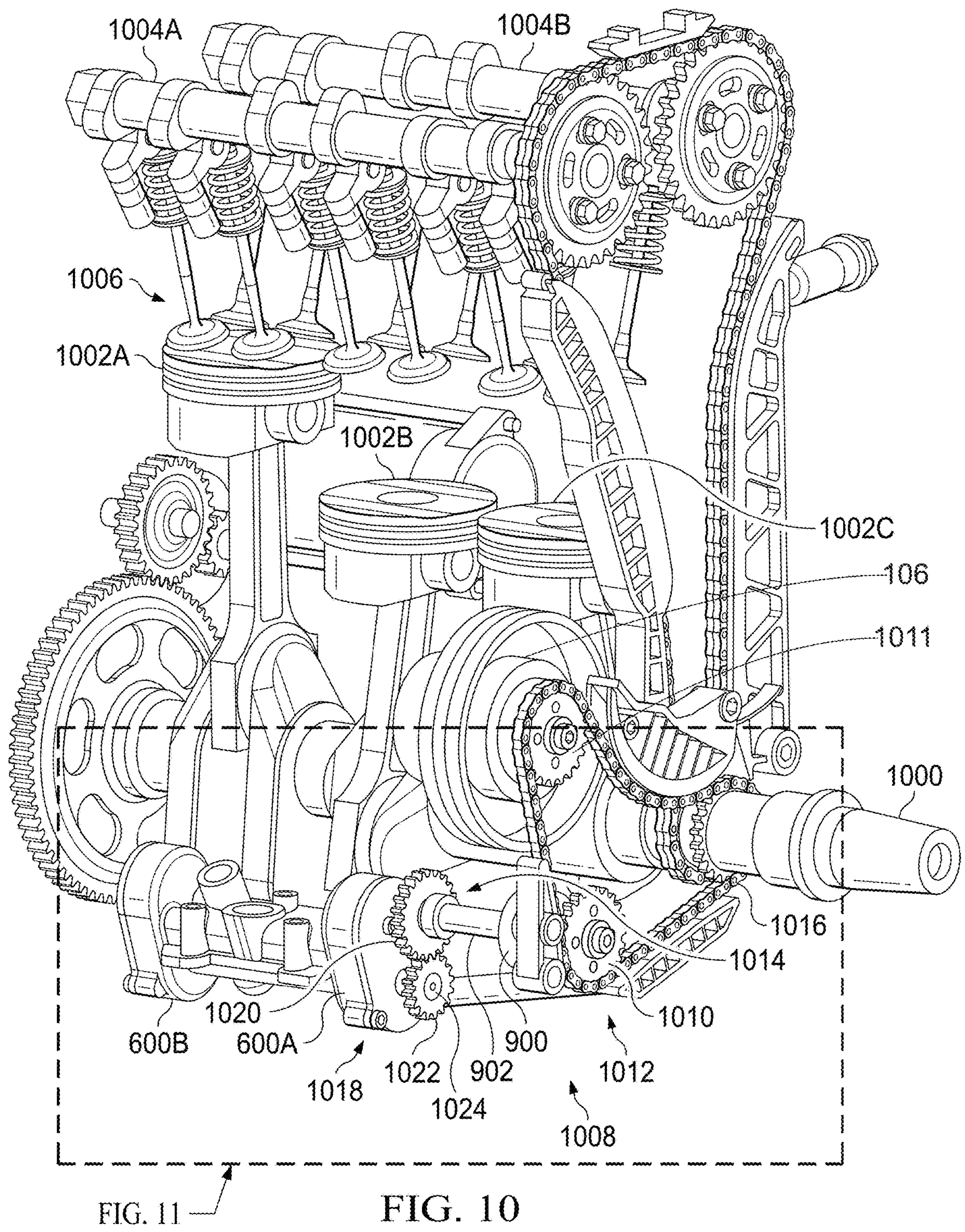
FIG. 10-12 are isometric views of portions of the engine assembly with a drive mechanism for scavenge pumps.

The present disclosure relates to engine assemblies of an off-road vehicle, represented as 100. FIGS. 1 and 2 illustrate off-road vehicles, such as a snowmobile and a side-by-side vehicle. Accordingly, the reference numeral 100 generally represents an off-road vehicle. The vehicle 100 extends from a front side (F1) to a rear side (R1) in a longitudinal direction that extends along a longitudinal axis (L1) of the vehicle 100 and a central axis (C1) of the vehicle 100 extending in the longitudinal direction and passing through a center of the vehicle 100. As shown in FIG. 3, the vehicle 100 has an engine assembly 102 (behind body panels not shown in FIG. 3) and other components that facilitate translation of combustion energy or thermal energy to rotational energy for enabling movement of the vehicle 100. The engine assembly 102 includes a crankcase 400 to house a crankshaft 1000 (see, e.g., FIGS. 4A and 10) for enabling rotation of the crankshaft 1000. The engine assembly 102 also includes an oil reservoir 308 to receive oil from the crankcase 400. The oil reservoir 308 is external to the crankcase 400 and may be positioned rearward of the crankcase 400. In some embodiments, the oil reservoir 308 is positioned toward the rear side (R1) of the vehicle 100 relative to the crankcase 400.

In some embodiments, the vehicle 100 is a snowmobile (see, e.g., FIG. 3). In some embodiments, a snowmobile may include a track 304 that transmits power from the engine assembly 102 to propel the snowmobile. In some embodiments, the track 304 is situated within a tunnel 302, which covers the top and upper sides of the track 304. In some embodiments, the engine assembly 102 is positioned forward of the tunnel 302. In some embodiments, a space 300 exists between the engine assembly 102 and the tunnel 302. In some embodiments, the oil reservoir 308 is positioned within the space 300 between the crankcase 400 and the tunnel 302. Thus, the height of the overall engine envelope can be reduced by positioning the oil reservoir 308 rearward of the crankcase 400 between the tunnel 302 instead of underneath the crankcase 400.

In some embodiments, the vehicle 100 is an off-road vehicle such as an ATV or UTV. As with the snowmobile, a similar situation occurs with a side-by-side off-road vehicle. The height of the overall engine envelope can be reduced with the oil reservoir 308 positioned rearward of the crankcase 400, such as between the transaxle assembly and the crankcase. Thus, in some embodiments, the oil reservoir 308 is positioned within the space 300 between the engine crankcase 400 and a transmission of the off-road vehicle.

In some embodiments, the engine assembly 102 is tilted toward the rear of the vehicle 100. In some embodiments, the engine vertical axis (A1) extends through the crankshaft and is oriented with an angle ($\alpha$1) with respect to the vertical axis (V1) of the vehicle 100 (see, e.g., FIG. 3). In this case, the top of the engine assembly 102 is tilted toward the rear side (R1) of the vehicle 100. The tilt angle ($\alpha$1) facilitates further reducing the height of the engine envelope within the vehicle 100, thereby enabling positioning the weight of the engine assembly 102 closer to the center of mass of the vehicle 100. In an illustrative example, an air plenum 109 is positioned on top of the cylinder head. Tilting the assembly rearward provides sufficient clearance for the engine assembly to fit within a welded frame assembly.

Figure 4A:
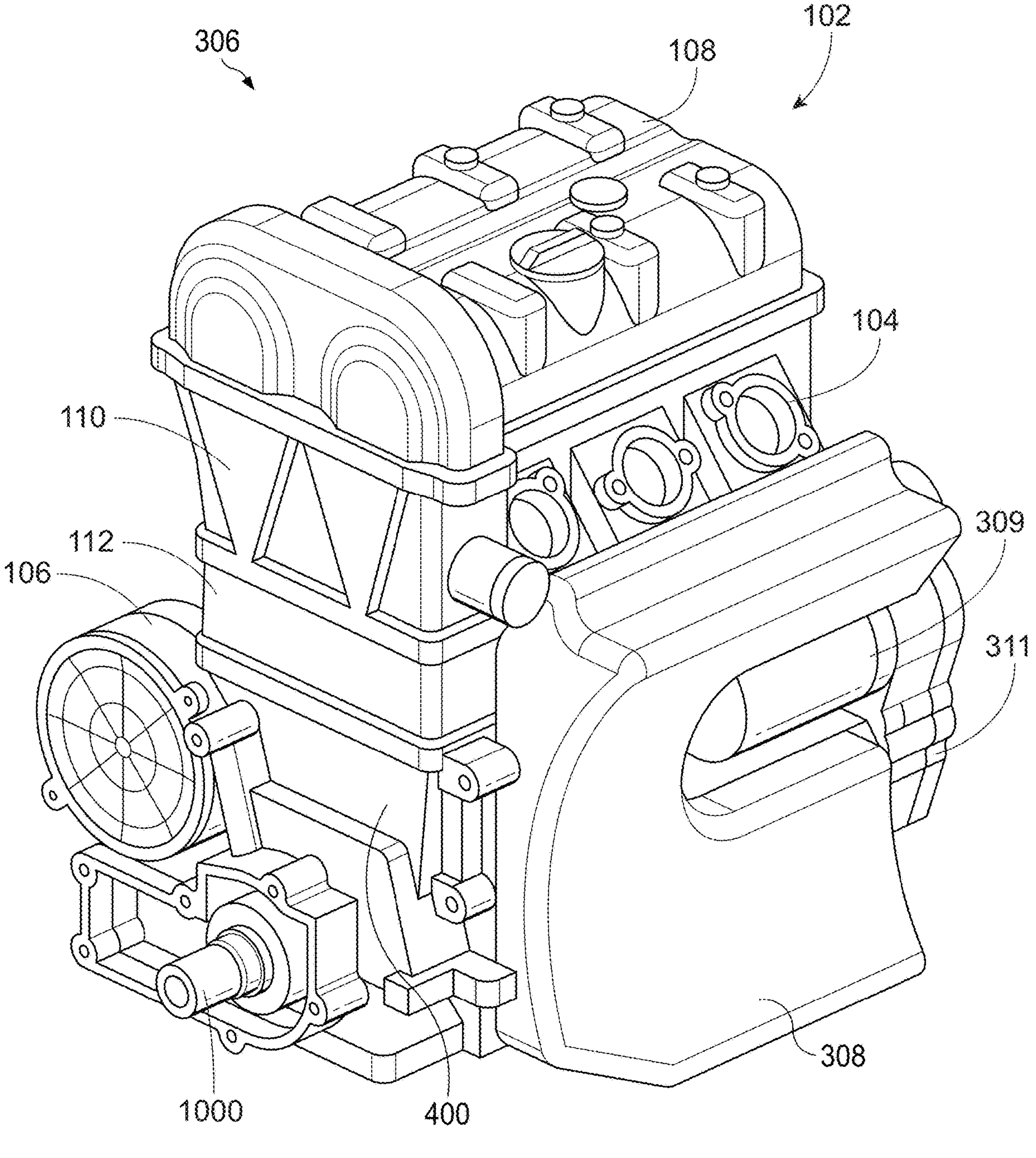
FIG. 4A is an isometric view of the engine assembly with an oil reservoir.
Figure 4B:
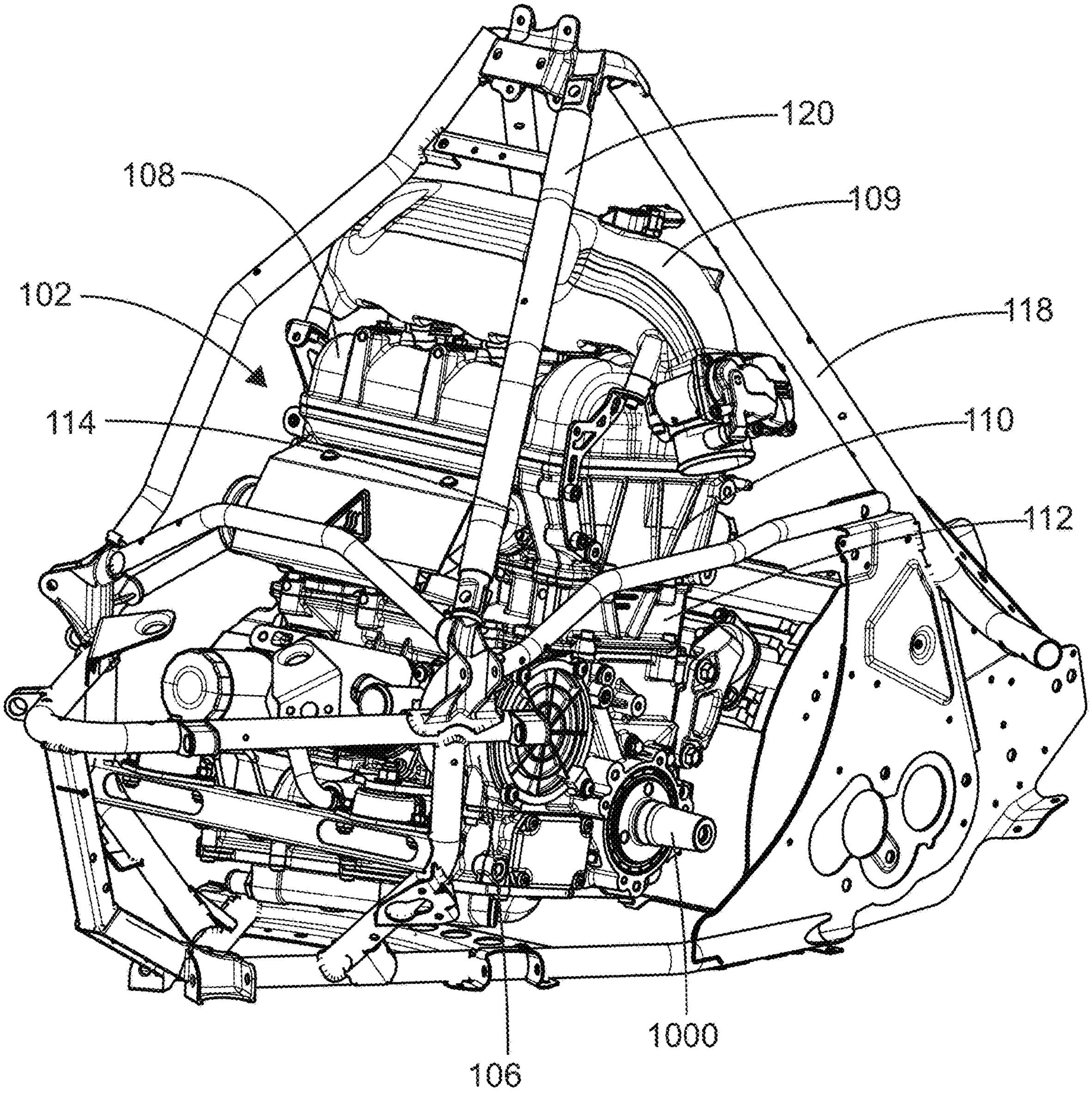
FIGS. 4B-4C are views of the engine assembly in a snowmobile chassis.
Figure 4C:
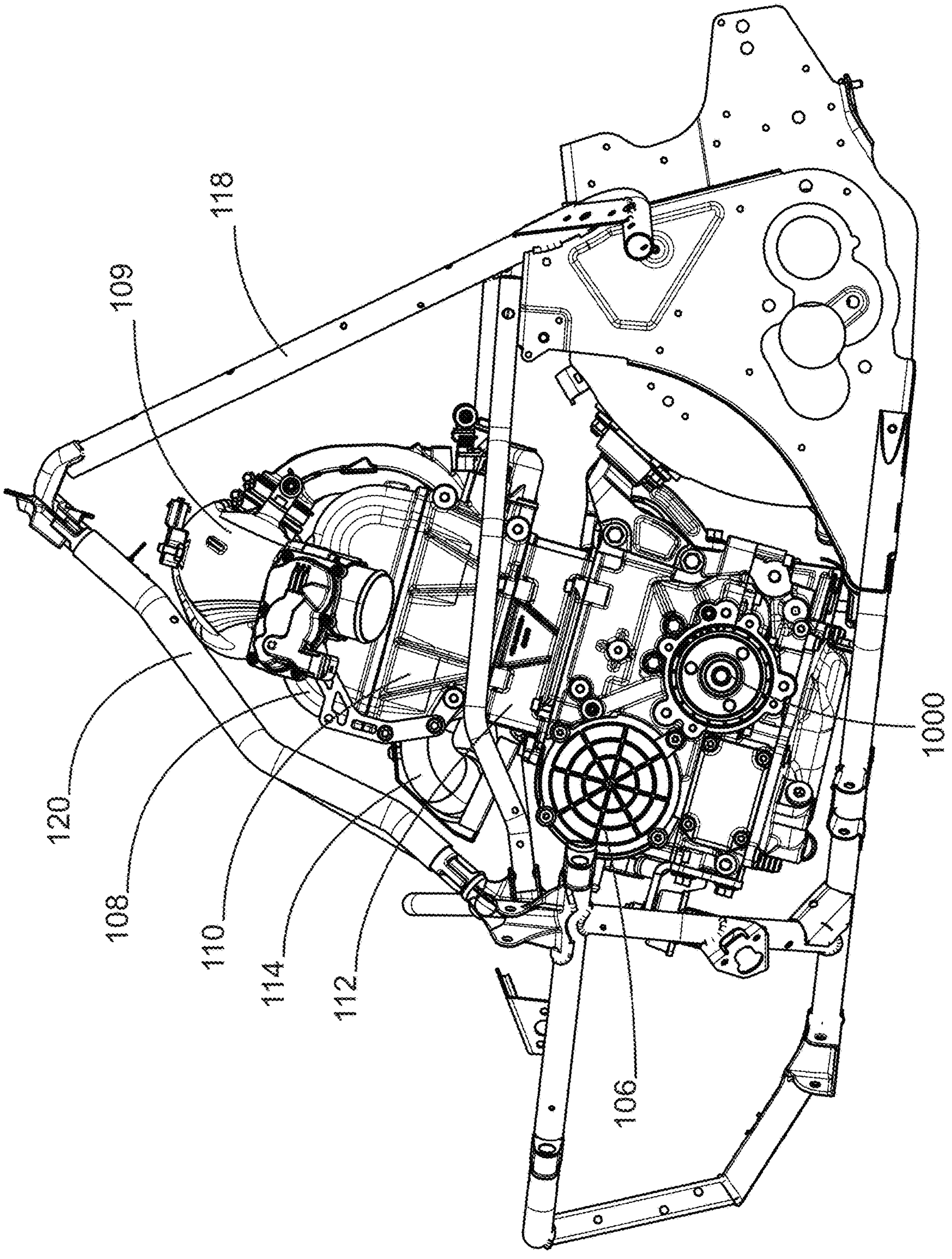

FIGS. 4B and 4C illustrate the engine 102 positioned within a welded frame assembly 118 of a snowmobile in one preferred embodiment. By removal of a single frame member 120, the engine with air plenum may be inserted within the frame and attached thereto after which the frame member 120 is re-secured. The rearward tilt of the engine assembly 102 keeps the center of mass of the engine low and rearward, close to the center of mass of the entire snowmobile. This provides advantages since the engine assembly 102 is one of the heaviest components of the snowmobile. It is also important due to the rotating masses within the engine affecting the nimbleness of the snowmobile due to gyroscopic forces.

Figure 15:
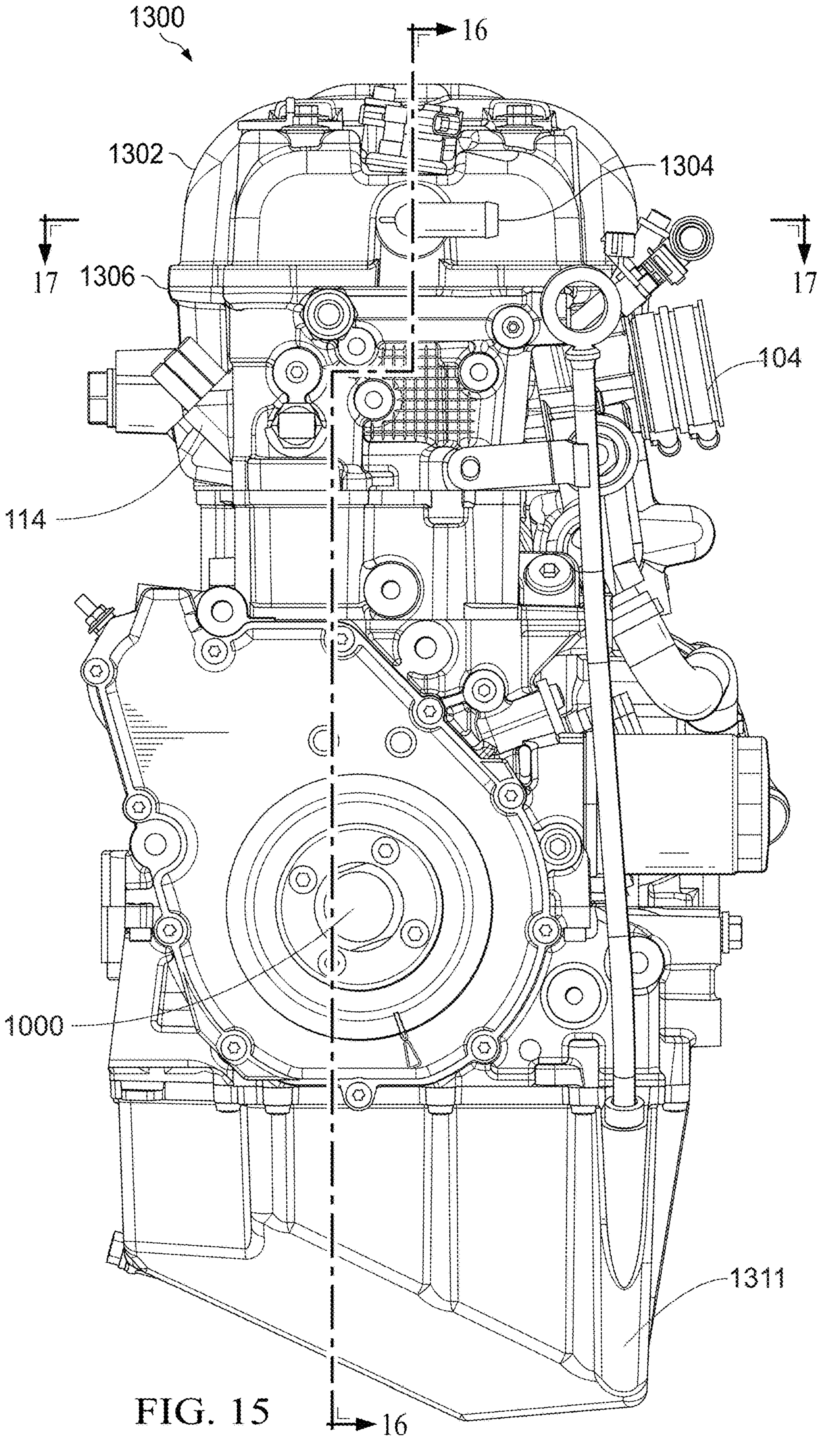
FIG. 15 is a side elevational view of the engine assembly with an oil separator.

In some embodiments, the oil reservoir 308 attaches to a rear exterior surface of the engine (see, e.g., FIG. 4A). Preferably, the oil reservoir 308 is secured to an exterior of the crankcase 400. The oil reservoir 308 may at least partially surround a starter motor 309 also positioned on the rear side of the engine assembly 102. In embodiments in which the starter motor 309 is positioned elsewhere, the oil reservoir 308 may have more volume or occupy a smaller overall extent as it would not have to have a void for the starter motor 309. FIG. 4A also shows combustion air intake ports 104, crankshaft 1000, a coolant pump 106, a valve cover 108, head 110, and cylinder block 112. In this embodiment, the air intake ports 104 are on the rear side of the engine 102 and the combustion exhaust ports 114 are on the front side (not shown in this view; see FIG. 15). This arrangement may be switched such that the exhaust ports 114 are on the rear and the intake ports 104 are on the front of engine 102.

In some embodiments, the oil reservoir 308 receives oil from the crankcase 400 via a first fluidic conveyance system (e.g., tubing) (not shown). Furthermore, in some embodiments, the oil reservoir 308 supplies oil back to the engine assembly 102 via a second fluidic conveyance system (not shown). Thus, in some embodiments, the oil reservoir 308 is used to store oil that is recirculated through the engine assembly 102. See further description below in connection with FIGS. 20A, 20B.

Figure 5:
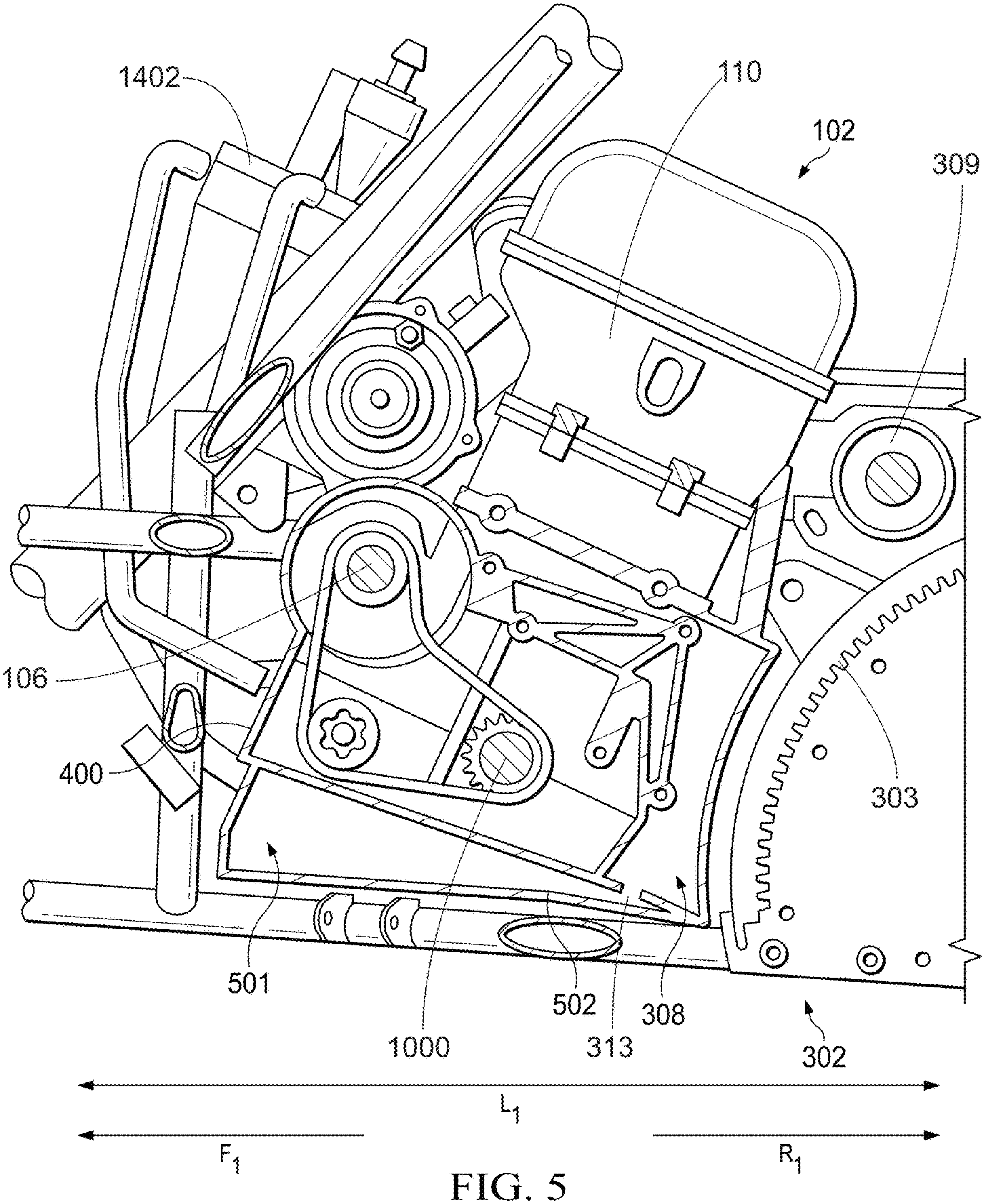
FIG. 5 is a side-elevational view of the engine assembly with an oil reservoir.

In some embodiments, the oil reservoir 308 is nested between the rear of the engine crankcase 400 and the front of the snowmobile tunnel 302 (see, e.g., FIG. 5). In some embodiments, the oil reservoir 308 is positioned to the rear side (R1) of the engine crankcase 400. In some embodiments, the tunnel 302 includes a heat exchanger 303 at the front of the tunnel 302. Preferably, the heat exchanger 303 at the front of the tunnel is curved in shape to at least somewhat follow the curvature of the front of the tunnel 302. In prior snowmobiles, the space between the crankcase 400 and the front of the tunnel/heat exchanger was simply vacant even though it is at or near the center of mass of the snowmobile. In an illustrative example as shown in FIGS. 4 and 5, the oil reservoir 308 may be shaped to conform to the arcuate shape of the heat exchanger. The oil reservoir 308 may be a self-contained unit that entirely contains the oil and is secured to a rear face of the crankcase 400. Alternatively, the oil reservoir may be defined partially by the rear face of the crankcase 400 and walls extending outward therefrom. A lid or cover may then be secured to the walls to define the oil reservoir 380 with the crankcase 400. The cover and walls may be shaped to conform to the arcuate shape of the heat exchanger when the engine assembly is installed in the chassis and tilted rearward.

Figure 9:
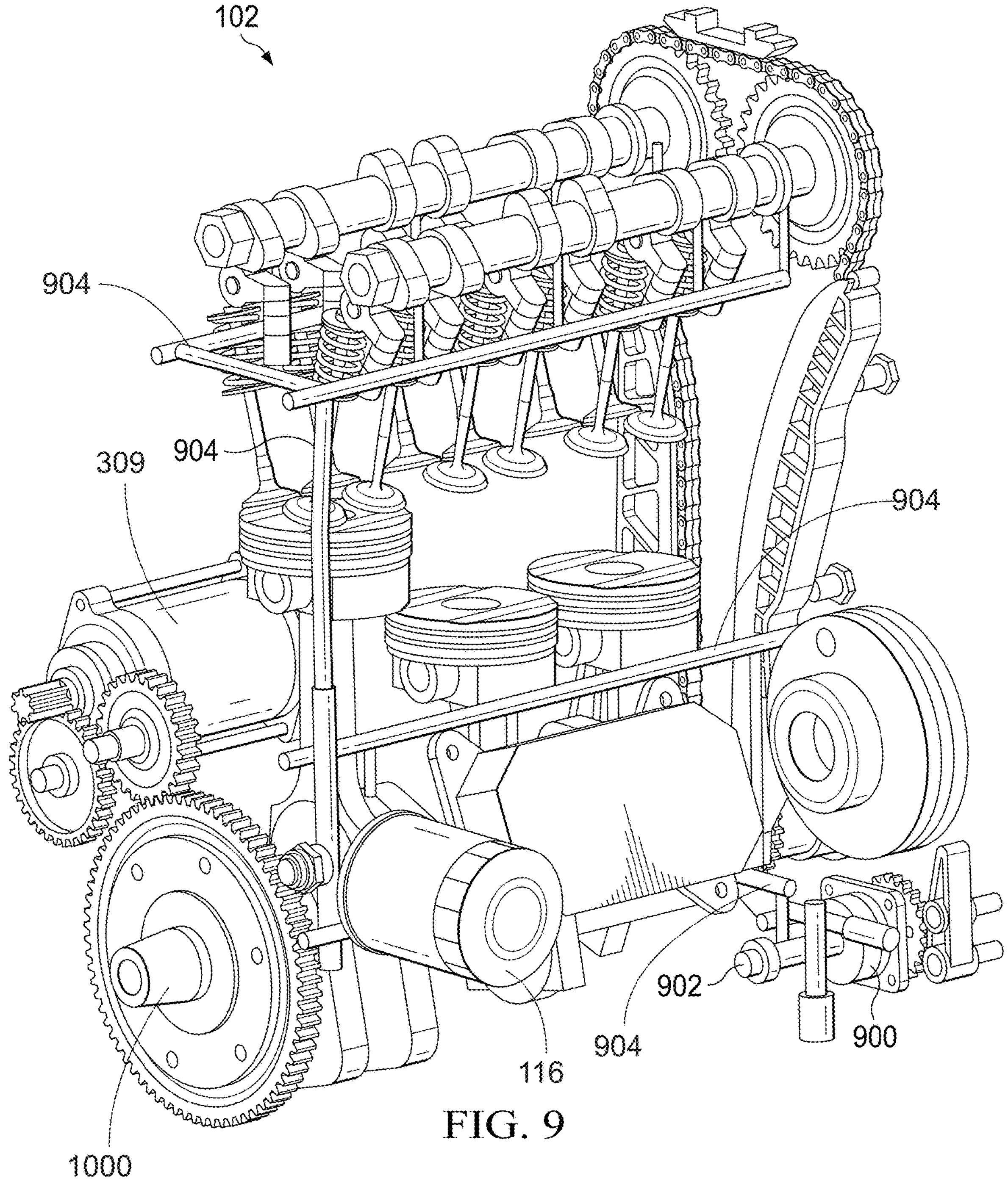
FIG. 9 is an isometric view of an oil supply system of the engine assembly.

As shown in FIGS. 4A and 9, the oil reservoir 308 may define an exterior chamber for receiving a starter motor therein. As shown in FIG. 4, the oil reservoir may extend around three sides of the starter motor 309 and have an open end allowing the starter motor 309 to engage a gear train that is operatively connected to the crankshaft 1000. A cover 311 for the gear train and flywheel extends over the crankshaft and the outboard end of the starter motor. In other preferred embodiments, the cover 311 may encase a generator at the end of the crankshaft. See related provisional application Ser. No. 63/544,072, incorporated herein by reference.

Note in FIG. 9 that the oil pump shaft 902 does not include a gear to drive a scavenge pump. This embodiment is a wet sump system that does not include a scavenge pump. Contrast this with the system shown in FIG. 10. The pump shaft 902 includes an additional gear 1020 on the inboard end thereof to drive the scavenge pump gear 1022. Thus, most of the same components are used with additions or subtractions based on the system-dry sump with scavenge pump(s) or wet sump with just the main oil pump 900.

Figure 13:
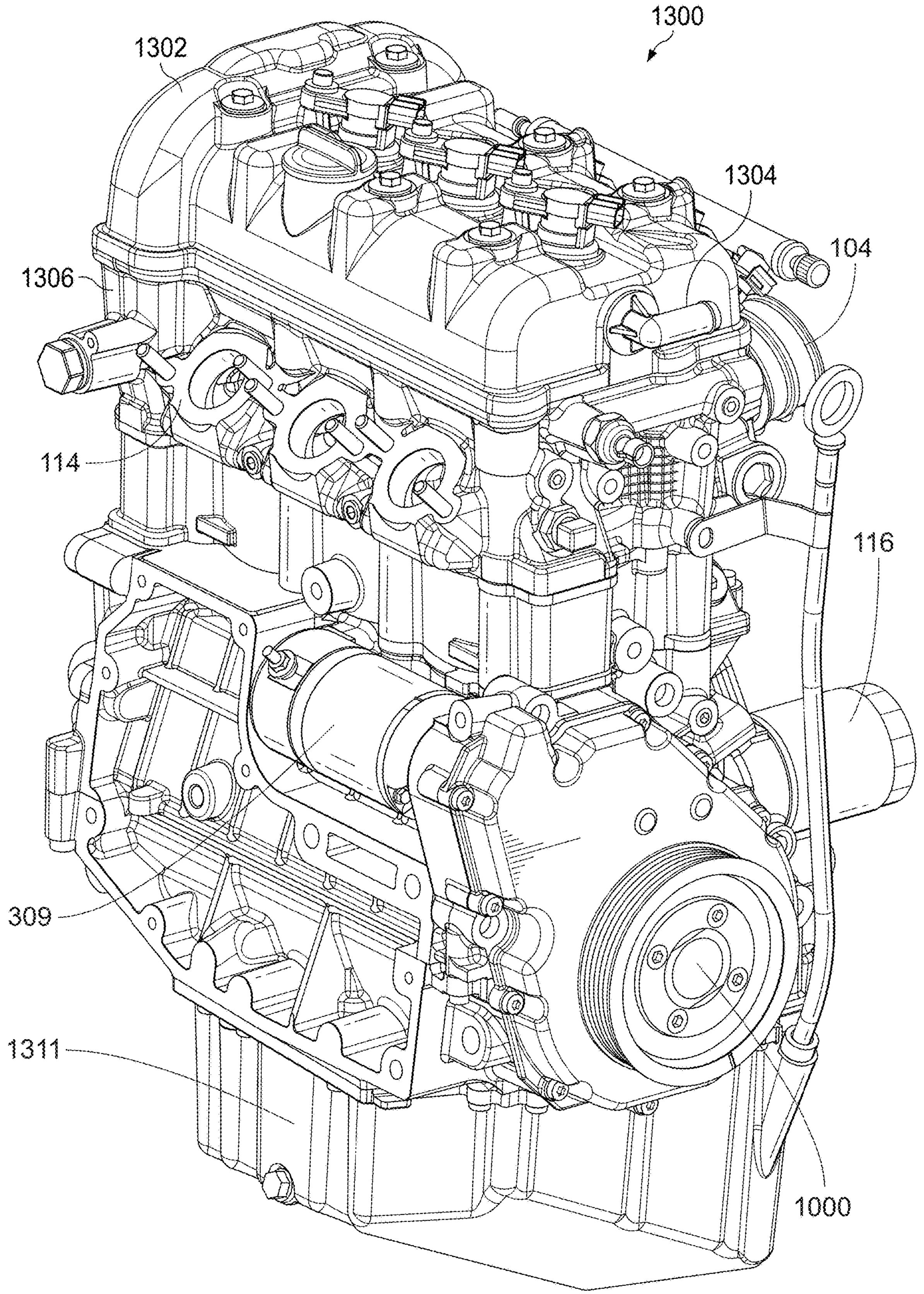
FIG. 13 is an isometric view of a wet sump engine assembly with an oil separator.
Figure 14:
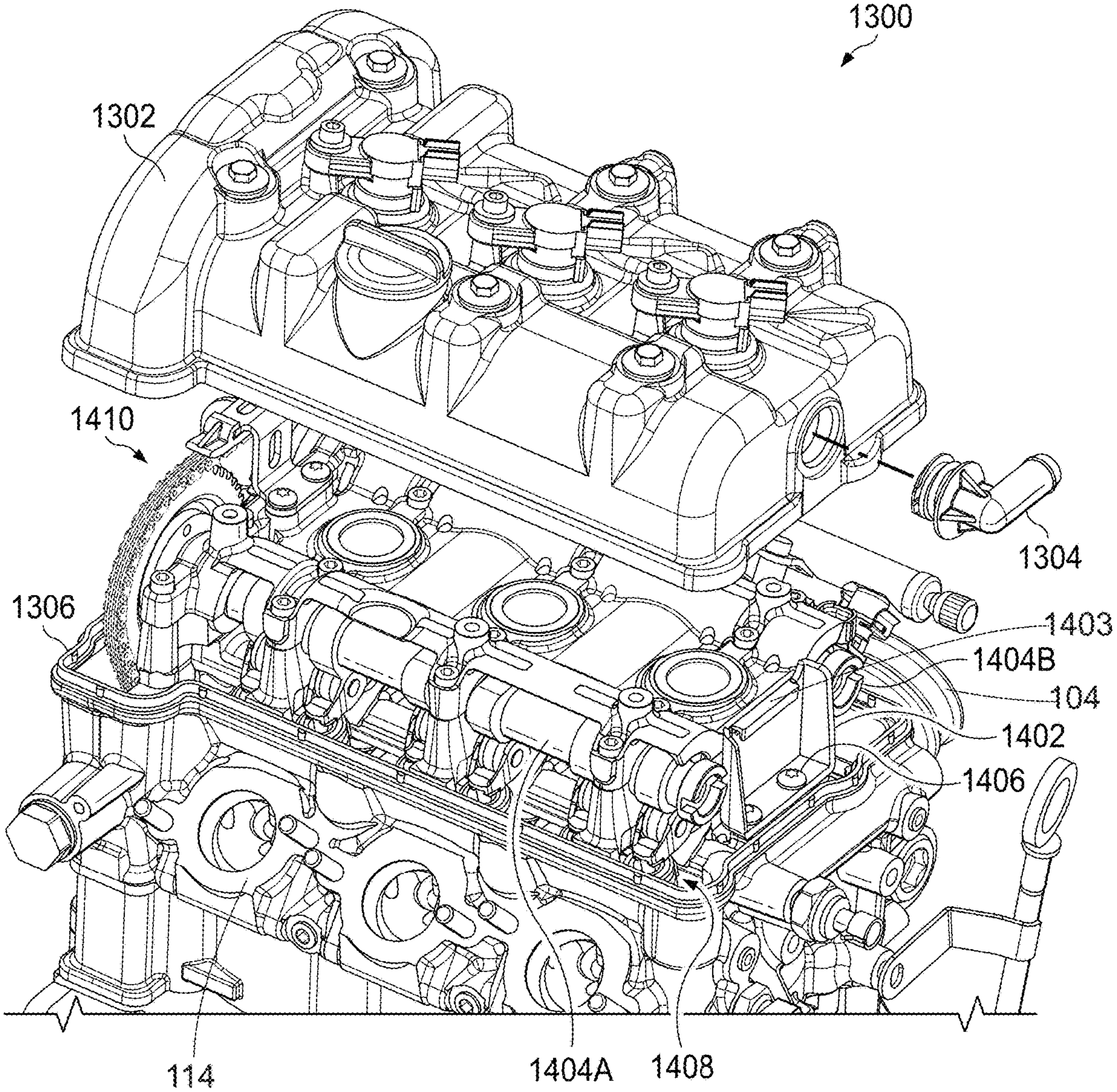
FIG. 14 is an exploded view of the engine assembly with an oil separator.

As shown in FIG. 13, the oil reservoir may extend along the lower surface of the starter motor and the inboard end. In either embodiment, the inboard end is protected by the oil reservoir 308, the outboard end is covered by the cover 311, and the rearward side of the starter motor is accessible via an opening defined by the oil reservoir 308.

A similar arrangement can be had with an off-road vehicle (e.g., ATV, UTV, etc.) by having the oil reservoir 308 positioned between the engine and transmission or transaxle. In some embodiments, the oil reservoir 308 couples the transmission or transaxle to the engine.

In some embodiments, the oil reservoir 308 is part of a dry-sump system for lubricating engine components (see, e.g., FIG. 9). In some embodiments implementing the dry-sump system, an oil collection pan 500 is used as an oil volume (see, e.g., FIG. 8). The oil collection pan 500 is positioned beneath the crankcase 400. The oil collection pan 500 receives oil from the crankcase 400. In some embodiments, an internal cavity of the crankcase 400 opens into the oil collection pan 500 such that oil drains down into the oil collection pan 500. In some embodiments, the oil is stored in both the oil collection pan 500 beneath the crankcase 400 and the oil reservoir 308. Thus, in some embodiments, the oil collects below the crankcase 400, although preferably the volume of oil in the oil collection pan 500 is less than a typical wet sump.

In some embodiments, the engine assembly 102 includes an oil reservoir 501 (see, e.g., FIG. 5) located under the engine assembly 102. When used in combination with the external oil reservoir 308, the oil reservoir 501 is configured to receive oil from the external oil reservoir 308. In some embodiments, a fluidic pathway (e.g., a drilled hole) connects the oil reservoir 308 and the oil reservoir 501. The oil reservoir 501 provides oil to the main feed pump 900. The oil collection pan 500 includes a barrier (e.g., wall) that separates the oil captured in the oil collection pan 500 from the oil reservoir 501. Thus, the oil collection pan 500 facilitates splitting oil from the oil reservoir 501. In some embodiments, the external oil reservoir 308 is configured to store a greater volume of oil than the oil reservoir 501 under the engine assembly 102. Thus, in some embodiments, the height of the oil collection pan 500 and oil reservoir 501 is less than needed for an oil reservoir in an equivalent wet-sump system.

As shown in FIG. 5, the oil reservoir may have a substantially triangular shape that decreases in height from the front of the oil reservoir 501 to the rear of the oil reservoir 501. The rearward point of the oil reservoir 501 may terminate at the intersection of a lower frame member and the arcuate heat exchanger. This shape accommodates the rearward tilt of the engine assembly while still positioning at least a portion of the oil reservoir 501 below the external reservoir 308. An aperture 313 may be provided in the lower portion of the external oil reservoir 308 that places the external oil reservoir 308 in fluid communication with the oil reservoir 501. At least 70% of the fluid volume of the oil reservoir 501 is positioned forward of the crankshaft 1000. FIG. 5 also shows the relative locations of the cylinder head 110, the coolant pump 106, and the starter motor 309.

Figure 6:
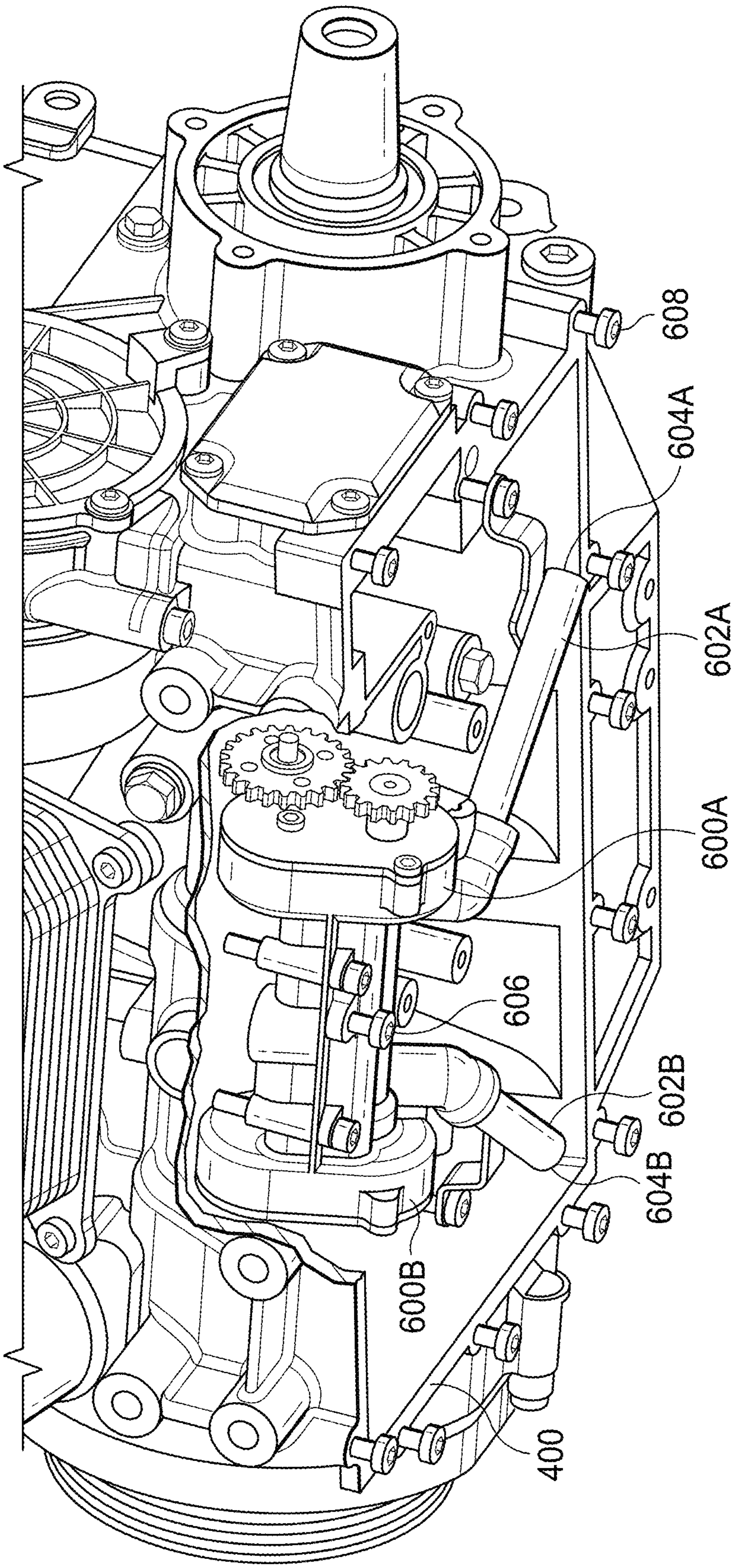
FIG. 6 is a bottom isometric view of the engine assembly with scavenge pumps.
Figure 7:
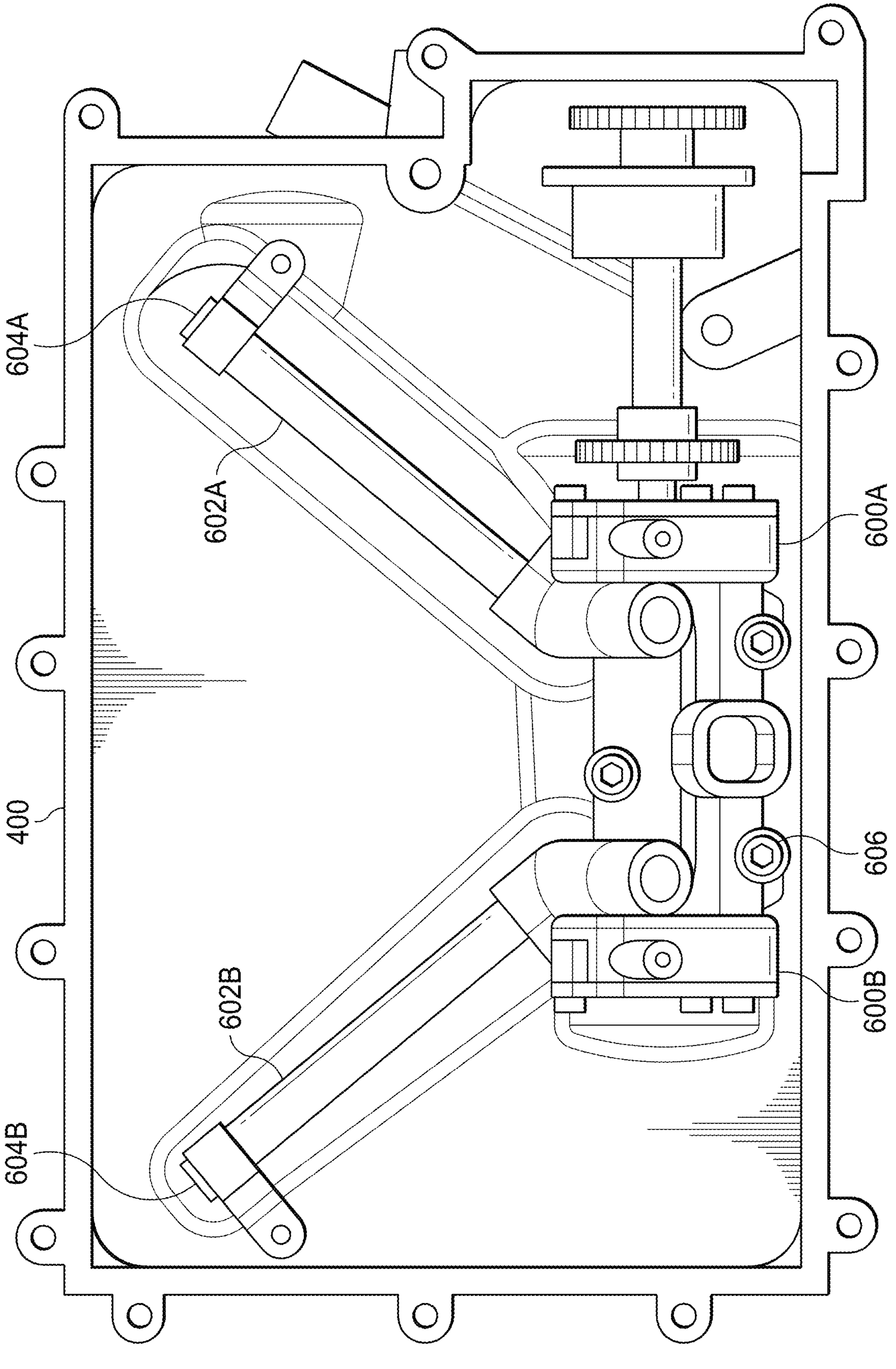
FIG. 7 is a view of the engine assembly scavenge pumps.

In some embodiments, the engine assembly 102 includes at least one scavenge pump configured to pump the oil from the oil collection pan 500 (see, e.g., FIGS. 6 and 7). In some embodiments, the engine assembly 102 includes a first scavenge pump 600A with a suction tube 602A having an opening 604A to pull oil out of the collection pan 500. In some embodiments, the engine assembly 102 also includes a second scavenge pump 600B with a suction tube 602B having an opening 604B to pull oil out of the collection pan 500. In some embodiments, the first scavenge pump 600A is joined to the second scavenge pump 600B and the first fasteners 606 attach the scavenge pumps 600A, 600B to the crankcase 400. In some embodiments, the second fasteners 608 attach the oil collection pan 500 to the crankcase 400.

In a typical engine configuration that uses a dry sump, the scavenge pumps are situated below the crankshaft in the lowest part of the engine. As the scavenge pumps occupy some space, this arrangement increases the height of the overall engine package. In some embodiments of the present disclosure, the scavenge pumps 600A, 600B are positioned within the crankcase 400. In an illustrative example, an air plenum is positioned on top of the cylinder head and positioning the scavenge pumps 600A and 600B within the crankcase 400 provides sufficient clearance for the engine assembly to fit within a welded frame assembly. In some embodiments of the present disclosure, the scavenge pumps 600A. 600B are positioned within the crankcase 400 forward of the crankshaft 1000. In some embodiments of the present disclosure, the scavenge pumps 600A, 600B are positioned within the crankcase 400 forward of the crankshaft 1000 and the coolant pump 106 rotational axis.

In some embodiments, the scavenge pumps 600A, 600B include at least one suction tube 602A, 602B extending rearwardly to a lowest point 502 of the oil collection pan 500 (see, e.g., FIG. 6). As described above, in some embodiments, the engine assembly 102 is tilted toward the rear of the vehicle 100 such that the lowest point 502 of the oil collection pan 500 (when vehicle is on flat terrain) is located at an opening of the at least one suction tube 602A, 602B during operation of the vehicle 100. Oil gathered at the bottom of the pan 500 will eventually be pulled from the pan during vehicle operation. The suction ends of the suction tubes 602A, 602B are not just located at the lowest point of the collection pan, but are at the rear of the collection pan such that oil is pulled in when the vehicle is under load, such as during acceleration or when climbing uphill. Thus, in some embodiments, at least one scavenge pump 600A, 600B is located above the opening of at least one suction tube 602A, 602B. In contrast to prior scavenge pump systems, the scavenge pumps 600A, 600B are, in some embodiments, situated forward of the engine crankshaft 1000. In some embodiments, the suction tubes 602A, 602B extend from the scavenge pumps 600A, 600B to the lowest point 502 of the oil collection pan 500 to pull the oil into the scavenge pumps 600A, 600B. By positioning the scavenge pumps 600A, 600B upward within the cavity of the crankcase 400 forward of the crankshaft 1000, the overall height of the engine envelope can be reduced. Furthermore, because the engine assembly 102 is in some embodiments is tilted toward the rear of the vehicle 100, oil will collect in the lowest point 502 of the oil collection pan 500, thus allowing the suction tubes 602A, 602B to capture the oil in or near the lowest point 502 of the oil collection pan 500. See the low troughs 603 for the scavenge pumps 600A, 600B and tubes 602A, 602B in FIG. 8. It should be noted that, while two scavenge pumps 600A, 600B are depicted herein, other embodiments implement only a single scavenge pump.

Figure 8:
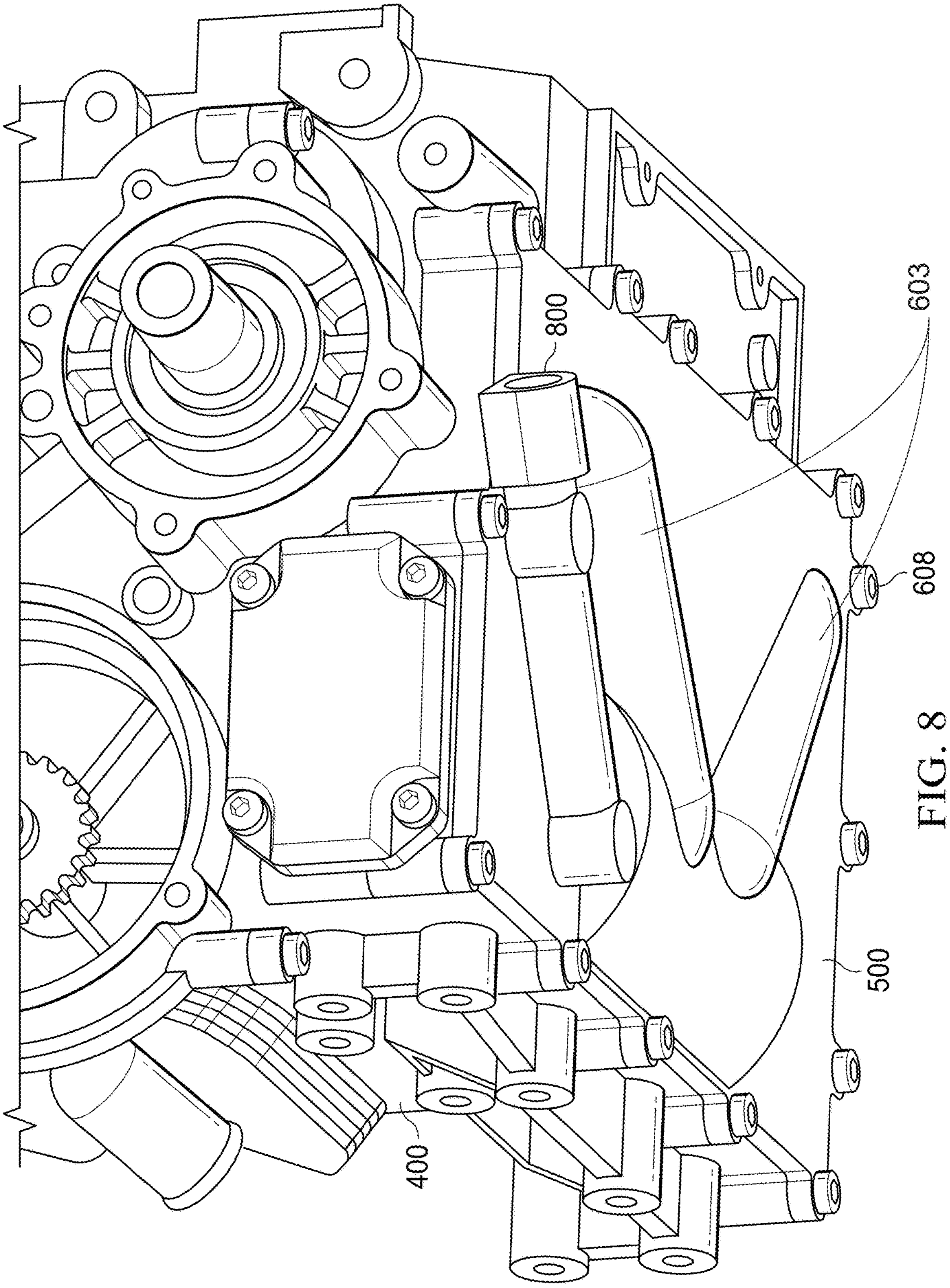
FIG. 8 is a bottom isometric view of the engine assembly with scavenge pumps.

As shown in FIGS. 7 and 8, the oil collection pan 500 may be shaped to define channels or troughs 603 for receiving the suction tubes 602A, 602B and lower portions of the scavenge pumps 600A, 600B.

In some embodiments, the oil collection pan 500 includes an outlet 800 for oil to pass from the scavenge pumps 600A, 600B out of the oil collection pan 500. In some embodiments, the outlet 800 defines an opening (e.g., a bore) to allow oil to flow out of the oil collection pan 500 (see, e.g., FIG. 8). In some embodiments, the outlet 800 is fluidically coupled to the external oil reservoir 308. In some embodiments, a tube connects the outlet 800 and the external oil reservoir 308. In some embodiments, pressure generated by the scavenge pumps 600A, 600B forces oil out of the oil collection pan 500 and into the external oil reservoir 308. In some embodiments having a wet sump system, an oil separator 610 (e.g., FIG. 20B) separates air from the oil provided to the oil reservoir 308. Thus, at least one scavenge pump 600A, 600B is configured to transfer oil from the oil collection pan 500 to an oil separator 610 before the oil is received at the oil reservoir 308.

In some embodiments, the engine assembly 102 includes a feed pump 900 to pump oil through the engine assembly 102 to lubricate, clean, and cool moving parts. The feed pump (or main oil pump) 900 is preferably a gear rotor type with an inner rotor and an outer rotor. The feed pump 900 is housed within the crankcase. In some embodiments, the feed pump 900 pumps oil through the oil supply line 904 to lubricate various engine components such as the crankshaft 1000, pistons 1002A, 1002B, 1002C, camshafts 1004A, 1004B, and the valve assembly 1006 (see, e.g., FIGS. 9 and 10). In some embodiments, oil from the oil reservoir 308 is supplied to the feed pump 900 using a fluidic connection between the oil reservoir 308 and the feed pump 900. The pump 900 supplies pressurized oil through oil lines 904 throughout the engine 102. Also shown in FIG. 9, the oil filter 116 is preferably positioned on one side of the engine 102, preferably the front, opposite the starter motor 309 on the rear side of the engine 102 (also shown in FIG. 13).

Figure 11:
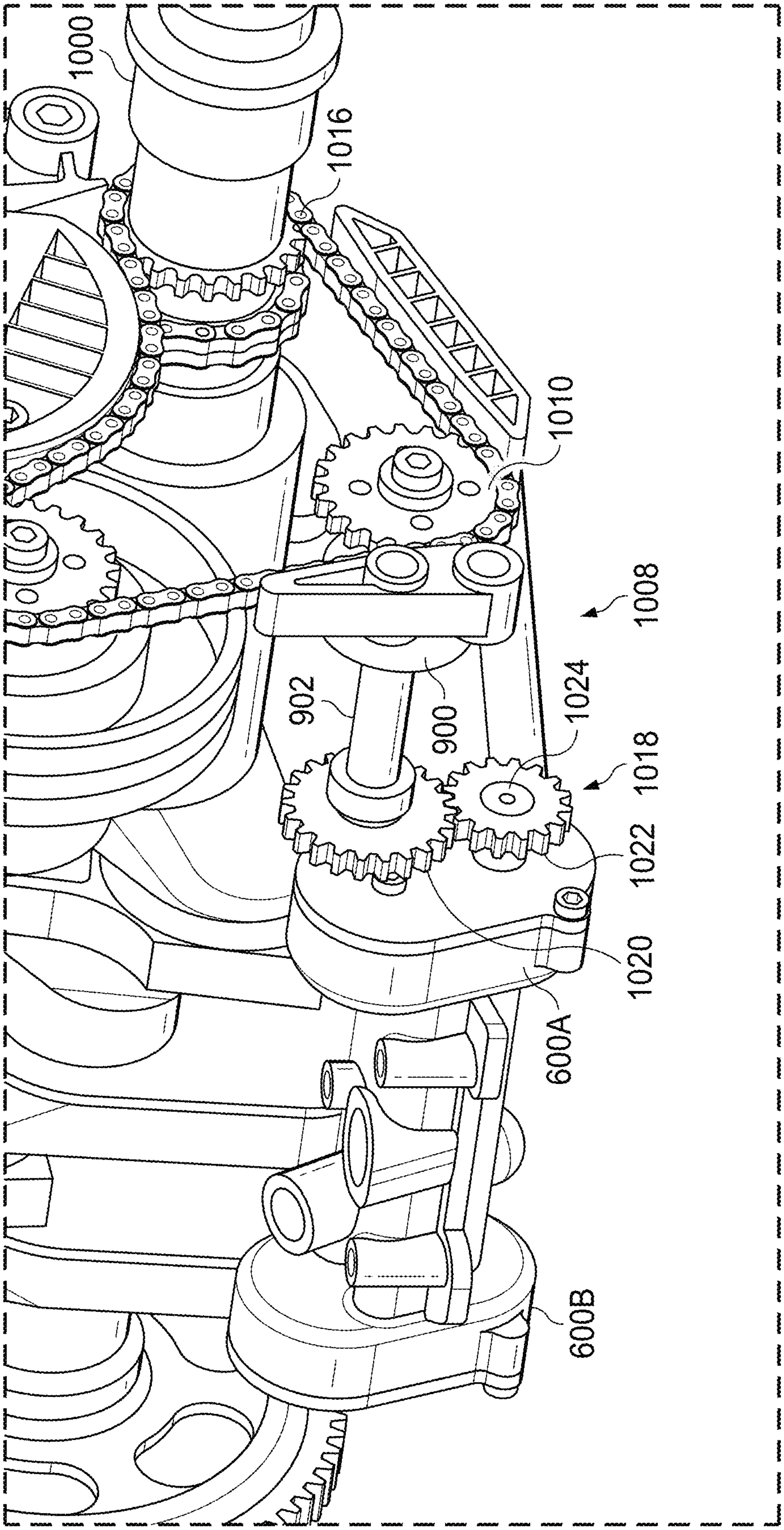
Figure 12:
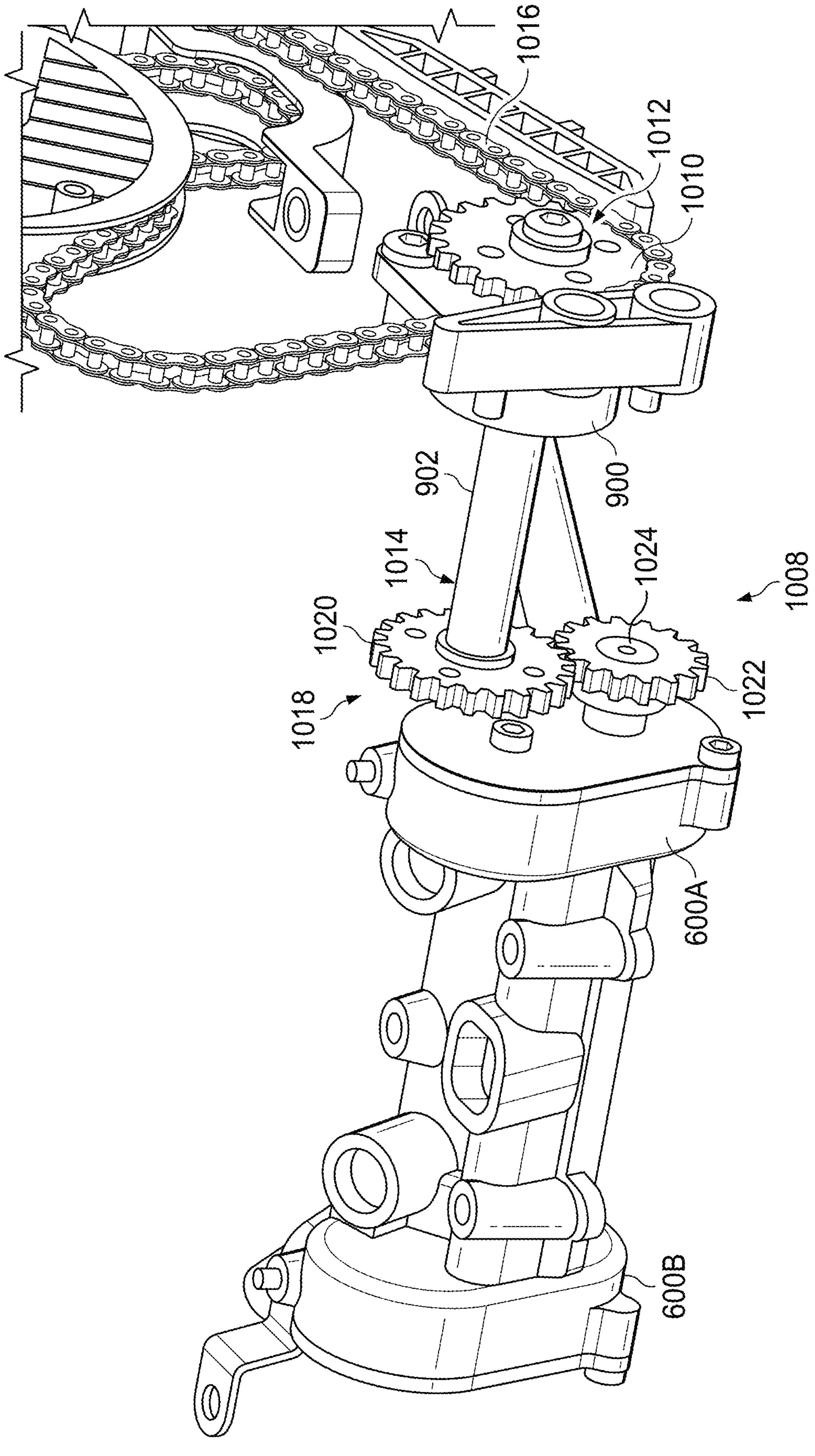

In some embodiments, the engine assembly 102 includes a drive mechanism 1008 to drive the feed pump 900 and the at least one scavenge pump 600A, 600B with the crankshaft 1000. In some embodiments, the drive mechanism 1008 includes an oil pump shaft 902 to drive the feed pump 900 (see, e.g., FIGS. 10, 11, and 12). In some embodiments, the oil pump shaft 902 passes through the feed pump 900. In some embodiments, the drive mechanism 1008 also includes a sprocket 1010 coupled to a first end 1012 of the oil pump shaft 902. In some embodiments, the sprocket 1010 is coupled to the crankshaft 1000 with a chain 1016. In some embodiments, a second sprocket 1011 is coupled to the crankshaft 1000 for driving other components such as the coolant pump 106. In some embodiments, the chain 1016 connects the sprocket 1010 and the second sprocket to transfer power from the crankshaft 1000 to the oil pump shaft 902. See related provisional application Ser. No. 63/544,072, incorporated herein by reference.

In some embodiments, the drive mechanism 1008 includes a gear train 1018 coupled to the oil pump shaft 902 to drive the at least one scavenge pump 600A, 600B. In some embodiments, the gear train 1018 includes a first gear 1020 coupled to a second end 1014 of the oil pump shaft 902. In some embodiments, the gear train 1018 also includes a second gear 1022 coupled to the at least one scavenge pump 600A, 600B. In some embodiments, the first gear 1020 is entrained with the second gear 1022 such that rotation of the first gear 1020 causes the second gear 1022 to rotate. In some embodiments, a scavenge pump shaft 1024 is coupled to the second gear 1022. In some embodiments, the scavenge pump shaft 1024 drives the scavenge pumps 600A, 600B. In some embodiments, different gear ratios are used for the gear train 1018 to cause the scavenge pumps 600A, 600B to operate at different speeds relative to the feed pump 900.

Referring now to FIGS. 13-19, in some embodiments having a wet sump oil system, the oil management of an engine assembly 1300 includes an oil separator 1402 configured to separate oil from a blow-by gas. In reciprocating internal combustion engines, a gas may leak at the piston, rings, or liner system. This gas is referred to as a blow-by gas. The blow-by gas may be a mixture of air, burned and unburned gases, and oil mist. In some embodiments, an oil separator 1402 is configured to separate oil from the blow-by gas. In some embodiments, the engine assembly 1300 is implemented as a wet sump, four-stroke engine. Wet sump engine is shown, for example, in FIGS. 13, 15, and 16 with the larger oil sump 1311 below the crankshaft 1000. In the wet sump system, a portion of the oil reservoir may be held within the crankshaft. Up to 75% of the volume of the oil reservoir may be defined by or open to the crankcase. In other embodiments, the engine assembly 130 is implemented as a dry sump, four-stroke engine, as shown, for example, in FIGS. 4-12, 20A, and 20B. Preferably, the wet sump engine is used more with over-dirt offroad vehicles whereas the dry sump engine is more preferable with snowmobiles.

Figure 16:
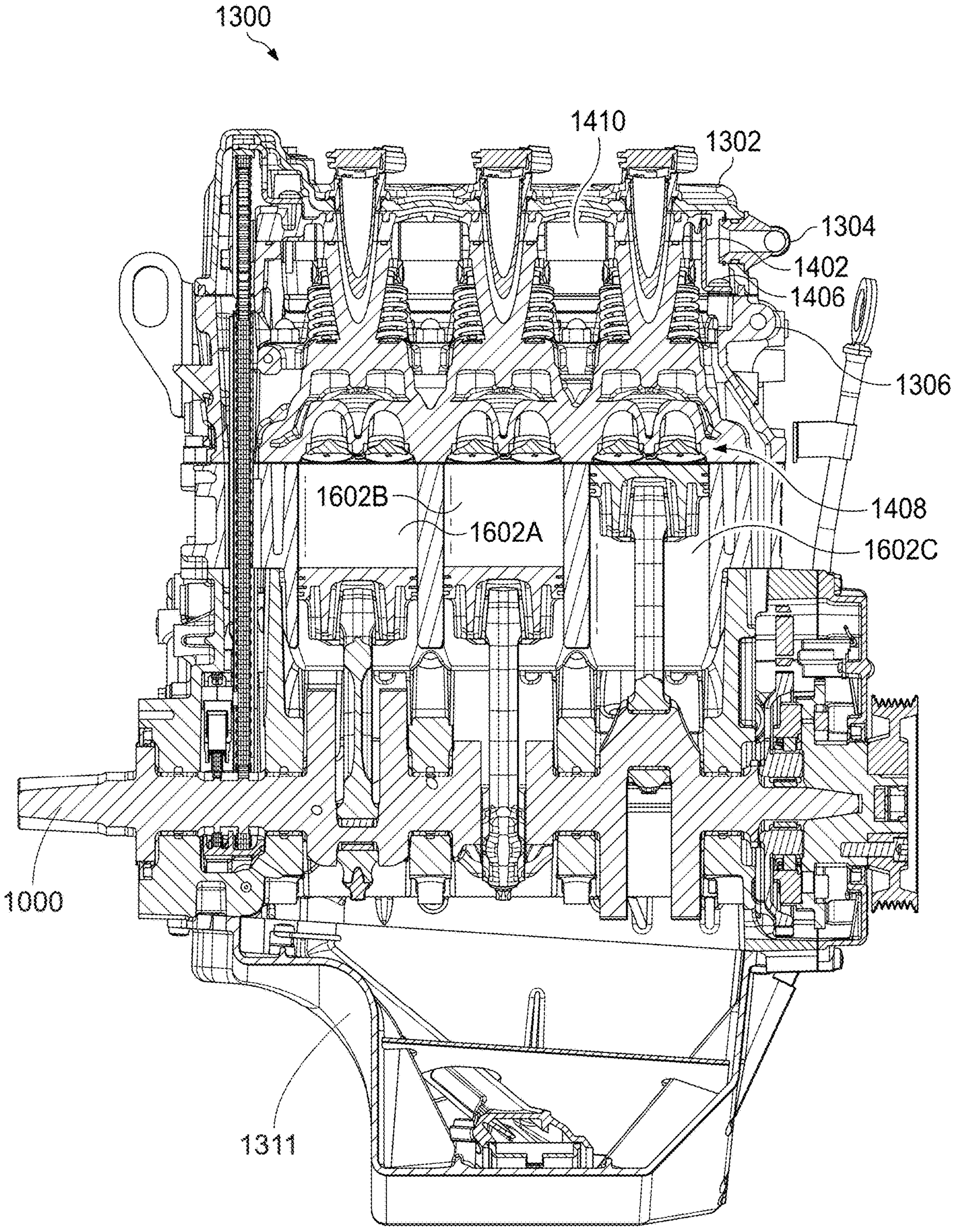
FIG. 16 is a cross-sectional elevation view of the engine assembly with an oil separator.
Figure 17:
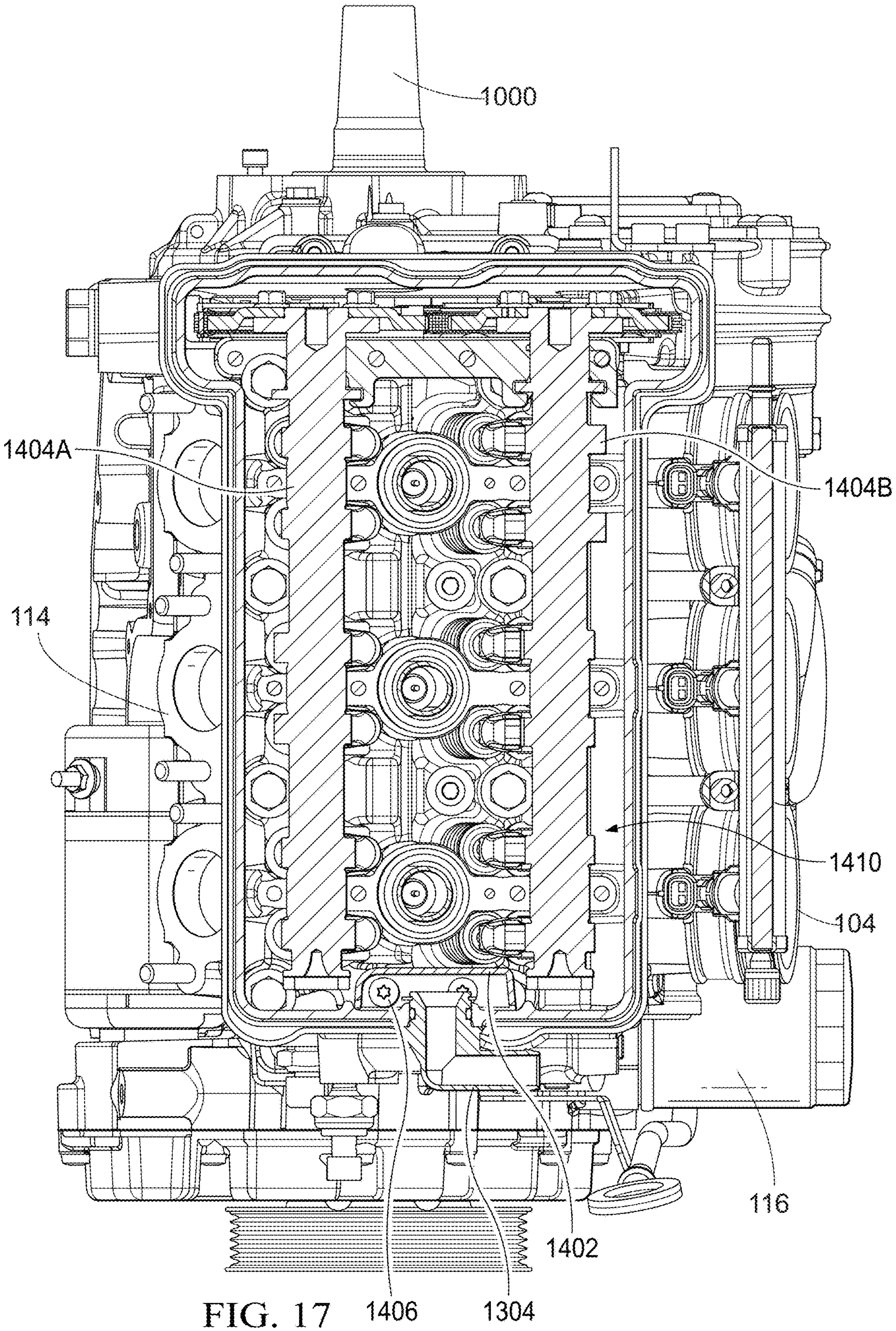
FIG. 17 is a cross-sectional top view of the engine assembly with an oil separator.
Figure 18:
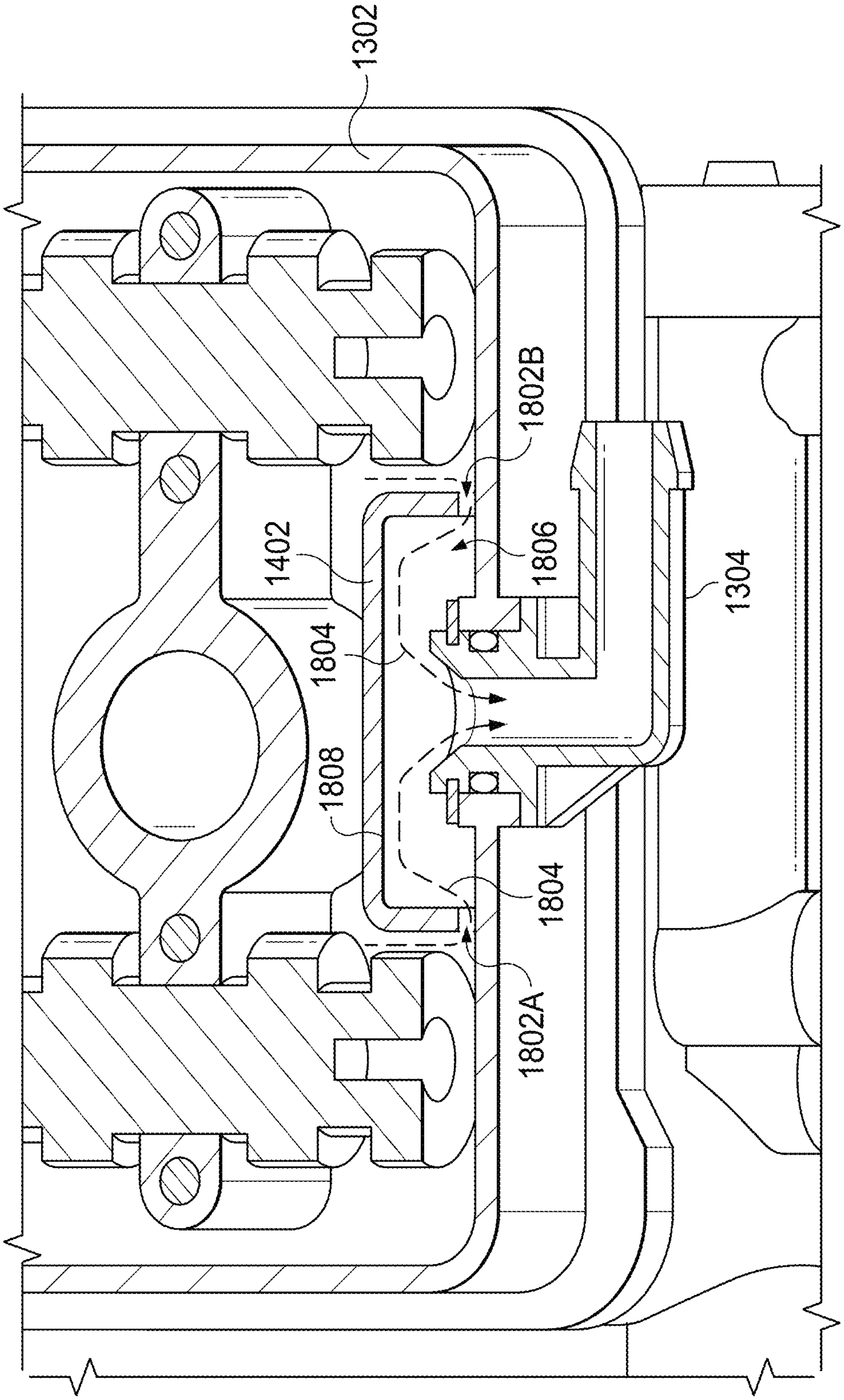
FIG. 18 is a cross-sectional top view of the engine assembly with an oil separator.
Figure 19:
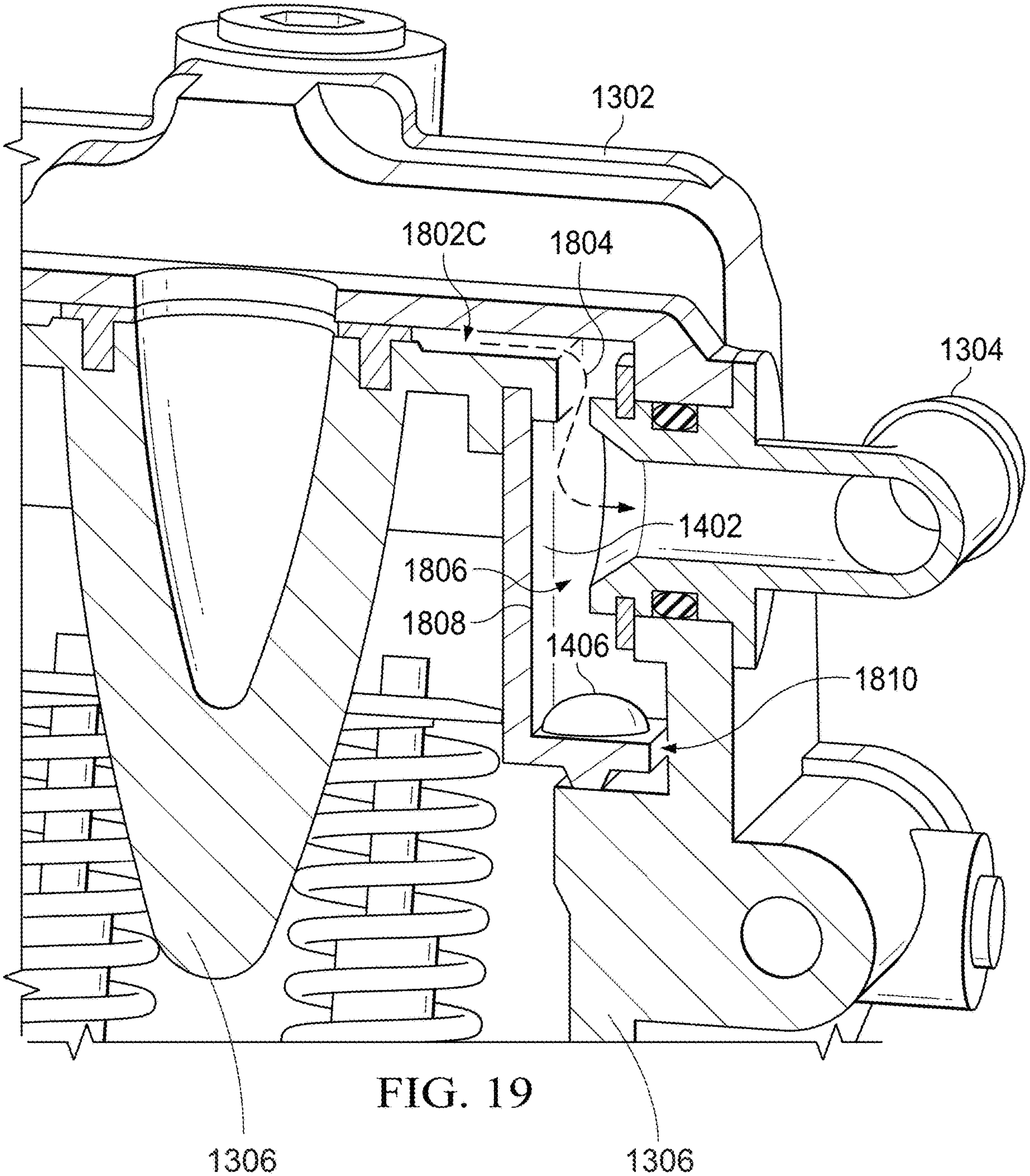
FIG. 19 is a cross-sectional, elevational view of the engine assembly with an oil separator.

The engine assembly 1300 includes a cylinder head 1306 to cover at least one cylinder 1602A, 1602B, 1602C (see, e.g., FIG. 16). The engine assembly 1300 also includes a valve cover 1302 that is configured to be mounted on top of the cylinder head 1306 (see, e.g., FIG. 13). In some embodiments, the valve cover 1302 houses or covers a valve assembly 1408 that includes at least one intake valve and at least one exhaust valve that are operated by one or more camshafts 1404A, 1404B (see, e.g., FIGS. 14 and 17). The valve cover 1302 is configured to cover the top of the cylinder head 1306. The valve cover 1302 defines a valve chamber 1410. The valve chamber 1410 includes a cavity formed by the valve cover 1302 and the cylinder head 1306.

In some embodiments, a blow-by gas exits the engine assembly 1300 through an outlet 1304. In some embodiments, the outlet 1304 provides the blow-by gas to a blow-by gas system that recirculates the blow-by gas back to an air intake of the engine assembly 1300 for combustion. Because the blow-by gas includes aerosolized oil, this oil would, if not for the present disclosure, otherwise be burned and lost by the re-combustion of the blow-by gas, thus decreasing the efficiency of the engine.

The oil separator 1402 is configured to separate oil from the blow-by gas exiting the engine assembly 1300 through the outlet 1304. In some embodiments, the oil separator 1402 shields the outlet 1304 from oil splashing within the valve chamber 1410. In some embodiments, the oil separator 1402 includes a solid, impermeable structure (e.g., a baffle, wall, or others) that prevents oil droplets from passing through it.

The engine assembly 1300 includes an oil separator 1402 configured to be secured to the cylinder head 1306 within the valve chamber 1410 (see, e.g., FIGS. 14 and 16-19). In some embodiments, the oil separator 1402 includes a central surface oriented perpendicular (e.g., vertical) to the cylinder head 1306. Two side surfaces and a top surface may project off the central vertical surface. In some embodiments, the oil separator 1402 also includes a bottom surface configured to bolt to the cylinder head 1306 with at least one fastener 1406. In some embodiments, when the oil separator 1402 and the valve cover 1302 are mounted on the cylinder head 1306, the oil separator 1402 is configured to not contact the valve cover 1302, which facilitates reducing vibration noise during operation of the engine assembly 1300. An inverted L-shaped bracket 1403 is provided by the cylinder head to secure the top of the oil separator 1402 shield.

In some embodiments, the oil separator 1402 is positioned at one side of the cylinder head 1306 between the camshafts 1404A, 1404B in front of the outlet 1304 such that the flow of the blow-by gas and oil must go around the oil separator 1402. In some embodiments with a single camshaft, the oil separator 1402 is positioned near the end of the camshaft in front of the outlet 1304.

In addition to blocking splashing oil, the oil separator 1402 in some embodiments facilitates separation of aerosolized oil from the blow-by gas. In some embodiments, the oil separator 1402 is configured to define a circuitous route 1804 for the oil and blow-by gas to enter the outlet 1304 (see, e.g., FIGS. 18 and 19). In some embodiments, the oil separator 1402 is configured to define at least one gap 1802A, 1802B, 1802C with the valve cover 1302. The blow-by gas and oil are blocked by the oil separator 1402 and pass through the at least one gap 1802A, 1802B, 1802C. In some embodiments, a first side surface of the oil separator 1402 forms a first gap 1802A with the valve cover 1302, a second side surface of the oil separator 1402 forms a second gap 1802B with the valve cover 1302, and a top surface of the oil separator 1402 forms a third gap 1802C with the valve cover 1302. The oil separator 1402 is further configured to define an oil separation volume 1806 between the valve chamber 1410 and the outlet 1304. The oil separation volume 1806 is a cavity formed by the oil separator 1402 that separates the valve chamber 1410 from the outlet 1304. The oil separation volume 1806 is accessible via the gap 1802A, 1802B, 1802C. Thus, the blow-by gas and oil may pass through at least one gap 1802A, 1802B, 1802C and enter the oil separation volume 1806.

As the blow-by gas and oil flow through the gaps 1802A, 1802B, 1802C, the area through which the blow-by gas and oil flow is reduced, resulting in an increased speed in the blow-by gas and oil flow through the gaps 1802A, 1802B, 1802C. However, the blow-by gas and oil reduce speed upon entering the oil separation volume 1806. The oil separates from the blow-by gas in response to the reduced speed in the oil separation volume 1806. In some embodiments, the circuitous route 1804 provides surfaces 1808 for the oil to contact and separate from the blow-by gas. The separated oil may collect within the oil separation volume 1806. Thus, upon slowing down within the oil separation volume 1806, the oil drains down one or more surfaces 1808 in response to the reduced speed.

In some embodiments, the oil separator 1402 is configured to define at least one drain gap 1810 with the valve cover 1302. In some embodiments, the bottom of the oil separator 1402 is offset from the valve cover 1302 to form a drain gap 1810. Separated oil may pass out of the oil separation volume 1806 through the at least one drain gap 1810 to an oil reservoir (e.g., an oil collection pan, wet sump, or others). By separating the oil from the blow-by gas, the oil separator 1402 facilitates reduced oil consumption by the blow-by system.

Figure 20A:
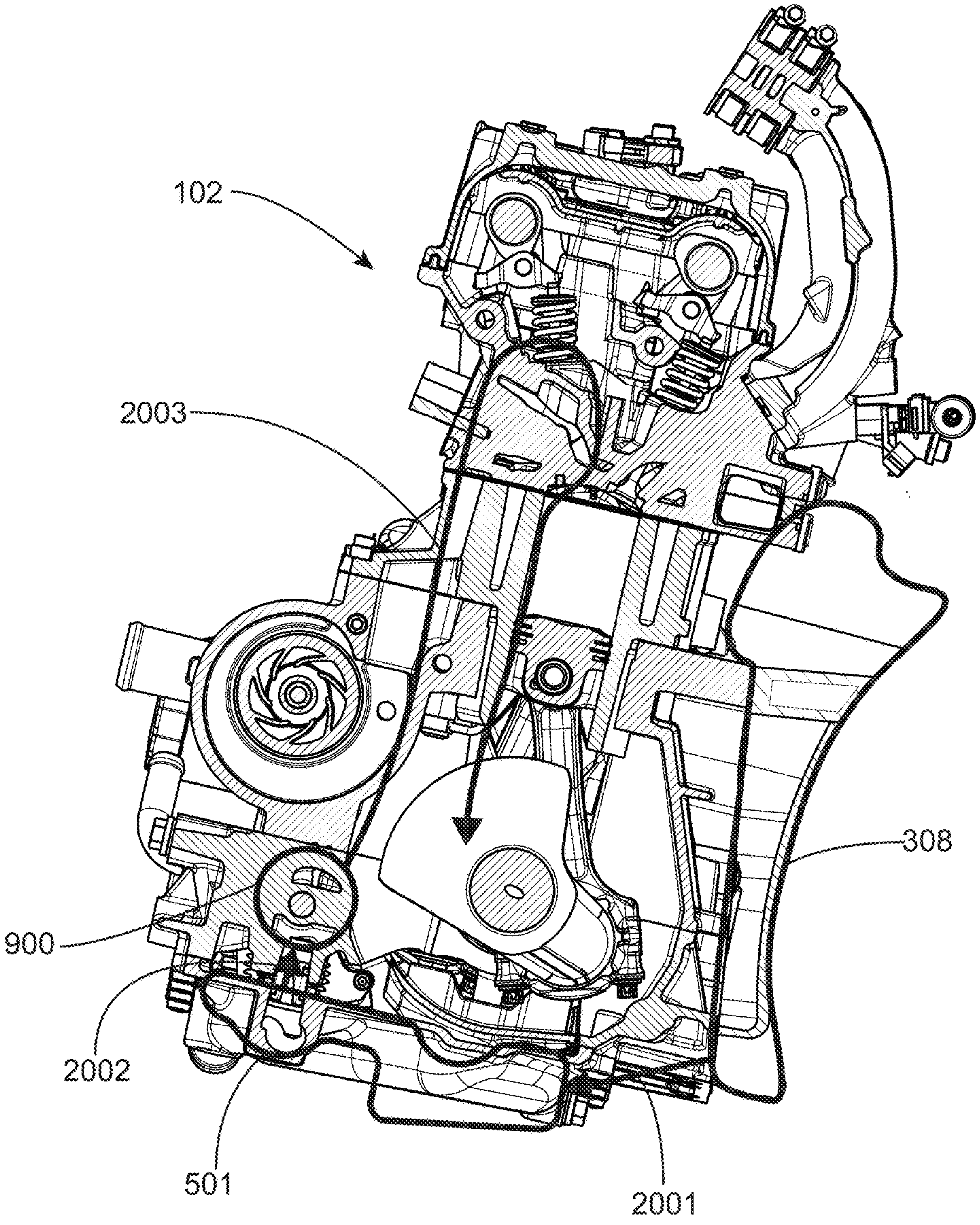
FIG. 20A-20B illustrate oil flow paths through the engine and oil reservoirs.
Figure 20B:
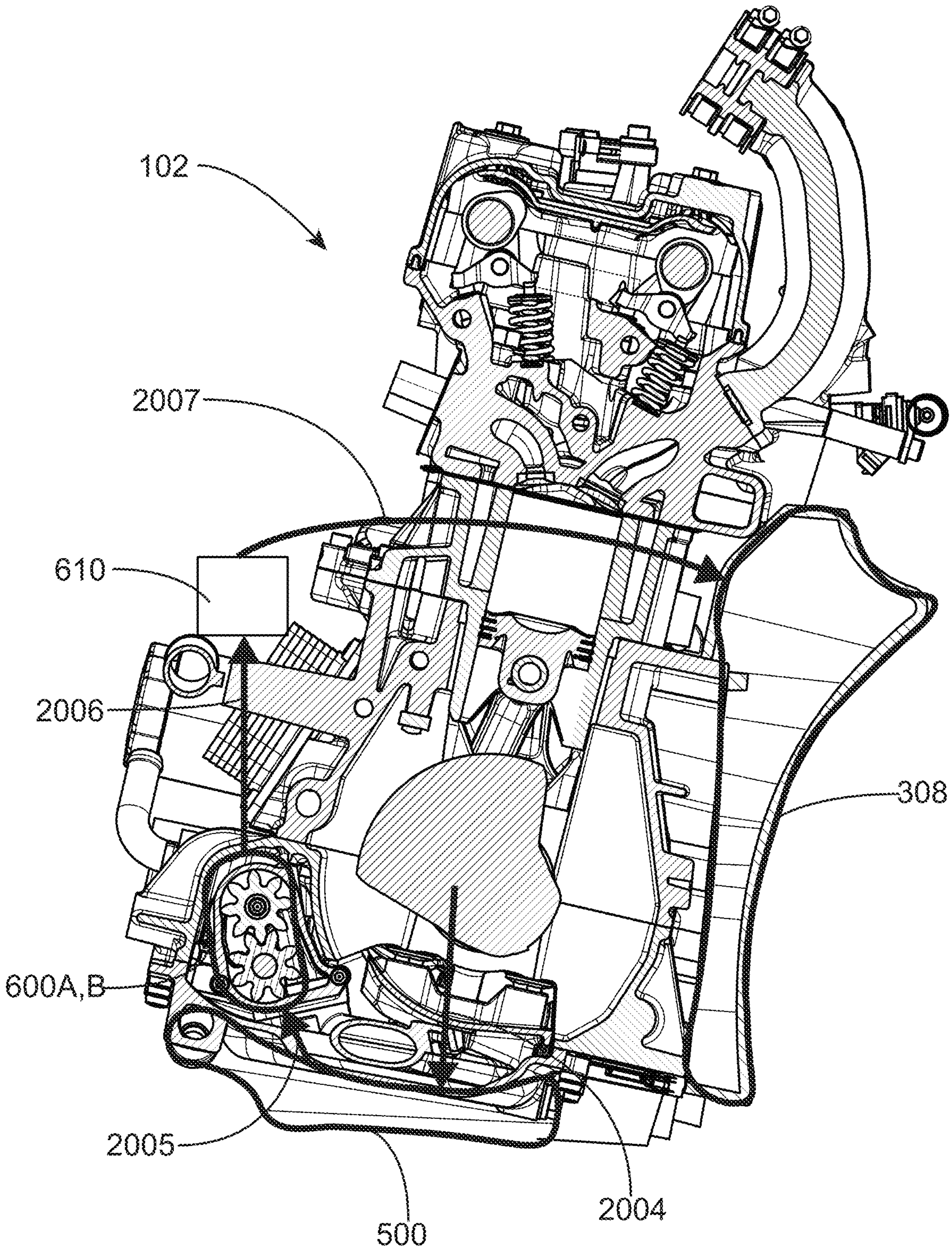

Turning now to FIGS. 20A and 20B, an embodiment of the flow of oil through a dry-sump engine assembly 102 is depicted. At 2001, oil stored in the oil reservoir 308 is provided to an additional oil reservoir 501 under the engine assembly 102. In some embodiments, holes formed in crankcase 400 may provide a fluidic pathway for the oil to flow from the oil reservoir 308 to the additional oil reservoir 501. In other embodiments, the oil reservoir 308 and additional oil reservoir 501 are connected with hoses. At 2002, oil in the additional oil reservoir 501 is provided to the feed pump 900. At 2003, the feed pump 900 provides pressure to pump oil through the oil supply line 904 of the engine assembly 102. At 2004, the oil flows through the crankcase 400 and collects in the oil collection pan 500. At 2005, the scavenge pumps 600A, B draw the oil out of the oil collection pan 500. At 2006, an oil separator 610 receives the oil from the scavenge pumps 600A, B. The oil separator 610 separates air from the oil. At 2007, the oil reservoir 308 receives the oil from the oil separator 610, and then returns to the additional oil reservoir 501 for recirculation through the engine assembly 102.

The fasteners used throughout the present disclosure may be nut and bolt fasteners used in automobile industry. In some embodiments, the bolt in such fasteners may have a hex-head, followed by a hex-headed cap screw and a stud.

It is to be noted that different values and parameters mentioned in the description are not intended to bound the specification in any manner.

As used herein, the following terms take the meanings explicitly associated herein, unless the context clearly dictates otherwise. The terms "front," "forward," "rear," and "rearward" are defined relative to the steering mechanism, such as a steering wheel, and the portion of the driver seat that is farthest from such steering mechanism. The terms "front" and "forward" indicate the direction from the portion of the driver seat farthest from the steering mechanism toward the steering mechanism. The terms "rear" and "rearward" indicate the direction from the steering mechanism toward the farthest portion of the driver seat. The terms "height," "vertical," "upper," "lower," "above," "below," "top," "bottom," "topmost," and "bottom-most" are defined relative to vertical axis of the vehicle. The vertical axis is non-parallel to the longitudinal axis and is defined as parallel to the direction of the earth's gravity force on the vehicle when the vehicle is on horizontal ground. The term "lateral" is defined relative to the lateral axis of the vehicle. The lateral axis is non-parallel to the longitudinal and vertical axes. The longitudinal axis extends forward and rearward through the vehicle in a horizontal plane.

The term "configured" as used herein means an element being one or more of sized, dimensioned, positioned, or oriented to achieve or provide the recited function or result. The term "directly coupled" as used herein means that a component contacts (for example, when bolted) or is welded to another component. The term "indirectly coupled" as used herein means that a first component is coupled to a second component by way of one or more intervening components that are directly coupled to the first and second components. A first component that is indirectly coupled to a second component is directly coupled to a third component, which may be directly coupled to the second component or to a fourth component that is directly coupled to the second component. The term "coupled" should therefore be understood to disclose both direct and indirect coupling of components or elements that are described as being coupled to each other.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

The term "engine assembly" used throughout the disclosure refers to an engine having a cylinder head, a cylinder block, a crankshaft, camshafts, a camshaft drive or a timing chain, a valve cover, and other associated parts.

The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular.

While preferred embodiments have been illustrated and described, as noted above, many changes can be made without departing from the spirit and scope of the invention. Each disclosure of a component preferably having a feature or characteristic is intended to also disclose the component as being devoid of that feature or characteristic unless the principles of the invention clearly dictate otherwise. Accordingly, the scope of the invention is not limited by the disclosure of the preferred embodiment. Instead, the invention should be determined entirely by reference to the claims that follow. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (such as "The apparatus or method of any one of the preceding or subsequent claims . . ."). This disclosure is also intended to disclose the subject matter of any one of the dependent claims, as if it were an independent claim, with or without all or a portion of the subject matter of the original independent claim(s) or any other subject matter disclosed herein.

The embodiments of the invention in which an exclusive property or privilege is claimed are defined as follows:

1. A snowmobile comprising:
- a chassis;
- a tunnel secured to the chassis, the tunnel including a forward end having an arcuate shape;
- a crankcase that houses a crankshaft, the crankcase including a body including a first side, a second side, a forward face extending from the first side to the second side, and a rearward face extending from the first side to the second side opposite the first face;
- an oil reservoir configured to receive oil from the crankcase, the oil reservoir being external to the crankcase, the oil reservoir being positioned between the forward end of the tunnel and the rearward face of the crankcase body, the reservoir defining an interior chamber for receiving oil and an exterior chamber, the rear face of the crankcase forming a forward wall of the oil reservoir; and
- a transmission external to the crankcase and external to the oil reservoir.

2. The snowmobile of claim 1, further comprising a starter motor secured to the rearward face of the crankcase body, the oil reservoir having a recess to receive the starter motor.

3. The snowmobile of claim 2, further comprising a generator cover at the first side of the engine, the cover covering an end of the starter motor and extending laterally adjacent a side of the oil reservoir.

4. The engine assembly of claim 1, further comprising a second oil reservoir beneath the crankcase, the oil reservoir on the rearward face having fluid communication through a channel integrated with the crankcase.

5. The engine assembly of claim 1, further comprising an oil collection pan positioned beneath the crankcase, the oil collection pan being configured to receive oil from the crankcase, whereby oil collection pan facilitates splitting the oil between the oil collection pan and an additional oil reservoir under the engine assembly.

6. The engine assembly of claim 5, wherein the engine assembly further includes at least one scavenge pump configured to transfer oil from the oil collection pan to an oil separator or the oil reservoir, the scavenge pump being driven by a gear engaged with an oil pump shaft.

7. The engine assembly of claim 5, wherein the oil reservoir is configured to store a greater volume of oil than the additional oil reservoir under the engine assembly.

8. The engine assembly of claim 1, wherein the oil reservoir is part of a dry-sump system for lubricating engine components.

9. An engine assembly of a vehicle, the engine assembly comprising:

a crankshaft;

a crankcase configured to house the crankshaft;

an oil collection pan coupled to the crankcase, the oil collection pan configured to receive oil from the crankcase; and at least one scavenge pump configured to pump the oil from the oil collection pan, the at least one scavenge pump being positioned within the crankcase forward of the crankshaft, the at least one scavenge pump including at least one suction tube extending rearwardly within the crankcase toward a low point of the oil collection pan such that the at least one suction tube suctions oil from at or near a low point of the oil collection pan within the crankcase, wherein the engine assembly is tilted toward a rear of the vehicle such that an opening of the at least one suction tube faces the low point of the oil collection pan during operation of the vehicle on a generally level surface.

10. The engine assembly of claim 9, wherein the at least one scavenge pump is located above the opening of the at least one suction tube.

11. The engine assembly of claim 9, wherein the at least one scavenge pump includes a first scavenge pump with a first suction tube and a second scavenge pump with a second suction tube.

12. The engine assembly of claim 9, further comprising a drive mechanism coupled to the crankshaft, the drive mechanism being configured to drive the at least one scavenge pump.

13. An engine assembly of a vehicle, the engine assembly comprising:

a crankshaft;

a crankcase configured to house the crankshaft;

a feed pump configured to pump oil through the engine assembly;

an oil collection pan coupled to the crankcase to receive the oil within the crankcase;

at least one scavenge pump separate from the feed pump and being positioned lower than the crankshaft, the at least one scavenge pump configured to pump the oil from the bottom of the oil collection pan; and a drive mechanism configured to drive the feed pump and the at least one scavenge pump with the crankshaft, wherein the drive mechanism includes an oil pump shaft extending from the center of the feed pump towards the at least one scavenge pump, the oil pump shaft is configured to drive the feed pump and includes a gear train coupled to the oil pump shaft to drive the at least one scavenge pump.

14. The engine assembly of claim 13, wherein the oil pump shaft passes through the feed pump, the oil pump and shaft being housed within the crankcase.

15. The engine assembly of claim 13, wherein the drive mechanism further includes a sprocket coupled to a first end of the oil pump shaft and wherein the sprocket couples to the crankshaft with a chain.

16. The engine assembly of claim 15, wherein the gear train includes a first gear coupled to a second end of the oil pump shaft and a second gear coupled to the at least one scavenge pump and wherein the at least one scavenge pump includes a first scavenge pump and a second scavenge pump, and wherein the drive mechanism includes a scavenge pump shaft coupled to the second gear of the gear train, wherein the scavenge pump shaft drives the first and second scavenge pumps.

17. The engine assembly of claim 13, wherein the engine assembly comprises a dry sump, four-stroke engine and wherein the dry sump oil pump is either fore or aft of an engine crankshaft.

18. The engine assembly of claim 13, wherein the scavenge pump includes an oil pickup that pulls oil from a rearward portion of a collection pan, the oil pump and scavenge pump being forward of the crankshaft.

19. The engine assembly of claim 13, further comprising an oil reservoir configured to receive the oil from the at least one scavenge pump, the oil reservoir being external to the crankcase, the oil reservoir being positioned rearward of the crankcase, and the oil reservoir being configured to supply the oil to the feed pump.

20. The engine assembly of claim 19, wherein the engine assembly is tilted toward a rear of the vehicle such that an opening of at least one suction tube faces a low point of the oil collection pan during operation of the vehicle.

21. The engine assembly of claim 19, wherein the vehicle includes a snowmobile.

22. The engine assembly of claim 21, wherein the oil reservoir is positioned between the crankcase and a tunnel for a track drive of the snowmobile.

* * * * *